United States Patent [19]

Sako et al.

[11] Patent Number: 5,675,586
[45] Date of Patent: Oct. 7, 1997

[54] RECORD MEDIUM, AND METHOD FOR RECORDING TO AND REPRODUCING FROM A RECORD MEDIUM

[75] Inventors: Yoichiro Sako, Chiba; Tamotsu Yamagami; Satoshi Otsuka, both of Kanagawa; Minoru Tobita, Tokyo, all of Japan

[73] Assignee: Sony Corporation, Tokyo, Japan

[21] Appl. No.: 526,641

[22] Filed: Sep. 11, 1995

[30] Foreign Application Priority Data

Sep. 12, 1994 [JP] Japan .................. 6-217683

[51] Int. Cl.$^6$ .................................. G11B 20/18
[52] U.S. Cl. ............................. 371/2.1; 371/40.1
[58] Field of Search ..................... 371/37.5, 2.1, 371/40.1

[56] References Cited

U.S. PATENT DOCUMENTS

| | | | |
|---|---|---|---|
| 4,677,622 | 6/1987 | Okamoto et al. | 371/37.5 |
| 4,835,627 | 5/1989 | Endo et al. | 360/32 |
| 4,882,732 | 11/1989 | Kaminaga | 371/2.2 |
| 4,972,417 | 11/1990 | Sako et al. | 371/37.4 |
| 4,975,915 | 12/1990 | Sako et al. | 371/37.4 |
| 4,998,252 | 3/1991 | Suzuki et al. | 371/37.5 |
| 5,325,371 | 6/1994 | Maeda et al. | 371/37.5 |

*Primary Examiner*—Stephen M. Baker
*Attorney, Agent, or Firm*—William S. Frommer; Alvin Sinderbrand

[57] ABSTRACT

Method of recording on a record medium by receiving a series of data elements, adding error detection and error correction data to each data element, moving some of the data in each data element to an adjacent data element to produce arranged data elements, and recording the arranged data elements in different sectors on a record medium. Upon reproduction of the arranged data elements from a record medium, some of the data in each arranged data element are moved to an adjacent data element to produce rearranged data elements. Errors in each rearranged data element are detected and corrected using data contained therein. A record medium having concentric tracks on which a plurality of sectors are located stores data in each of the sectors. The data in each sector pertains to two different sectors so that the affect of a burst error on a particular sector is minimized.

45 Claims, 21 Drawing Sheets

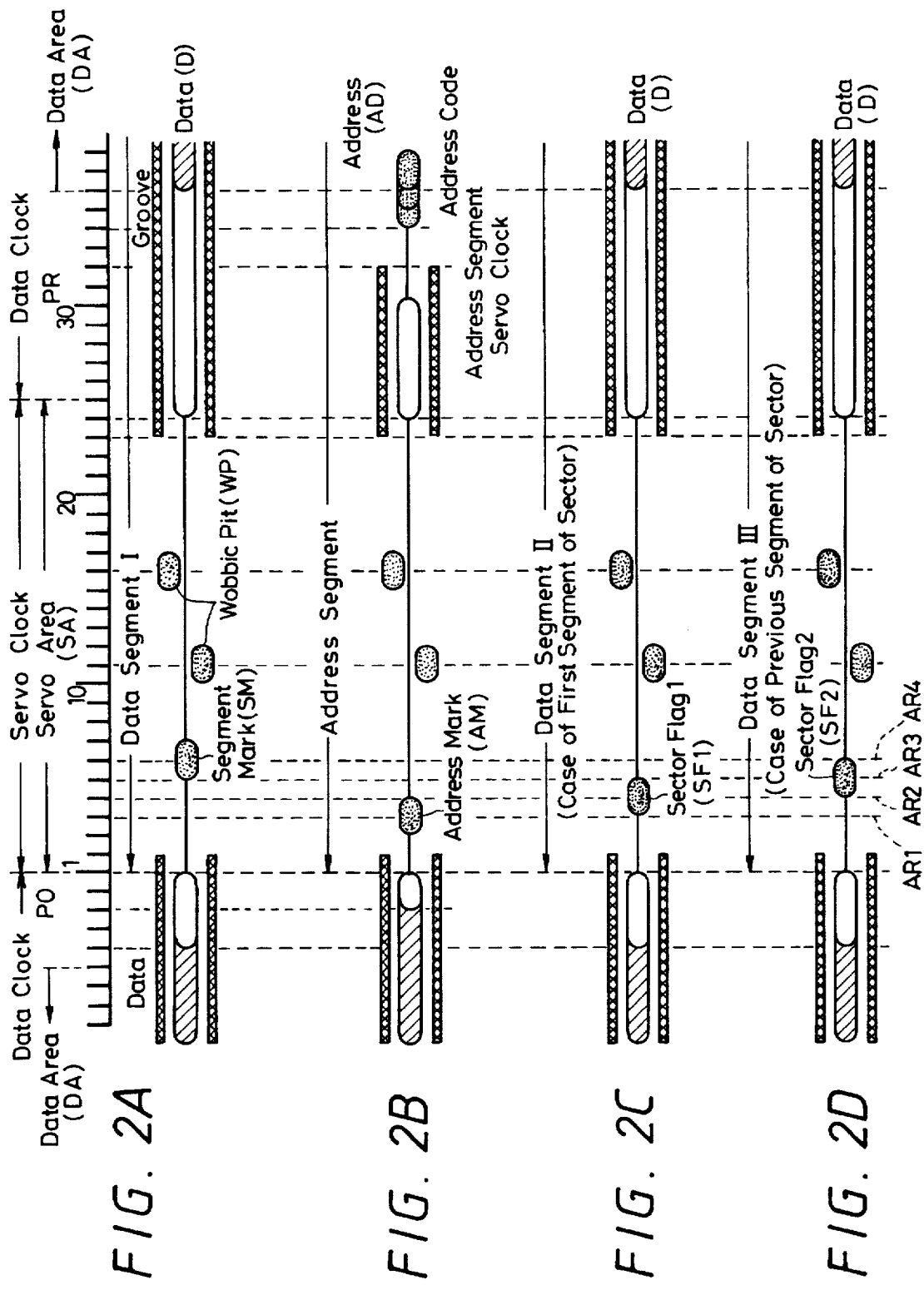

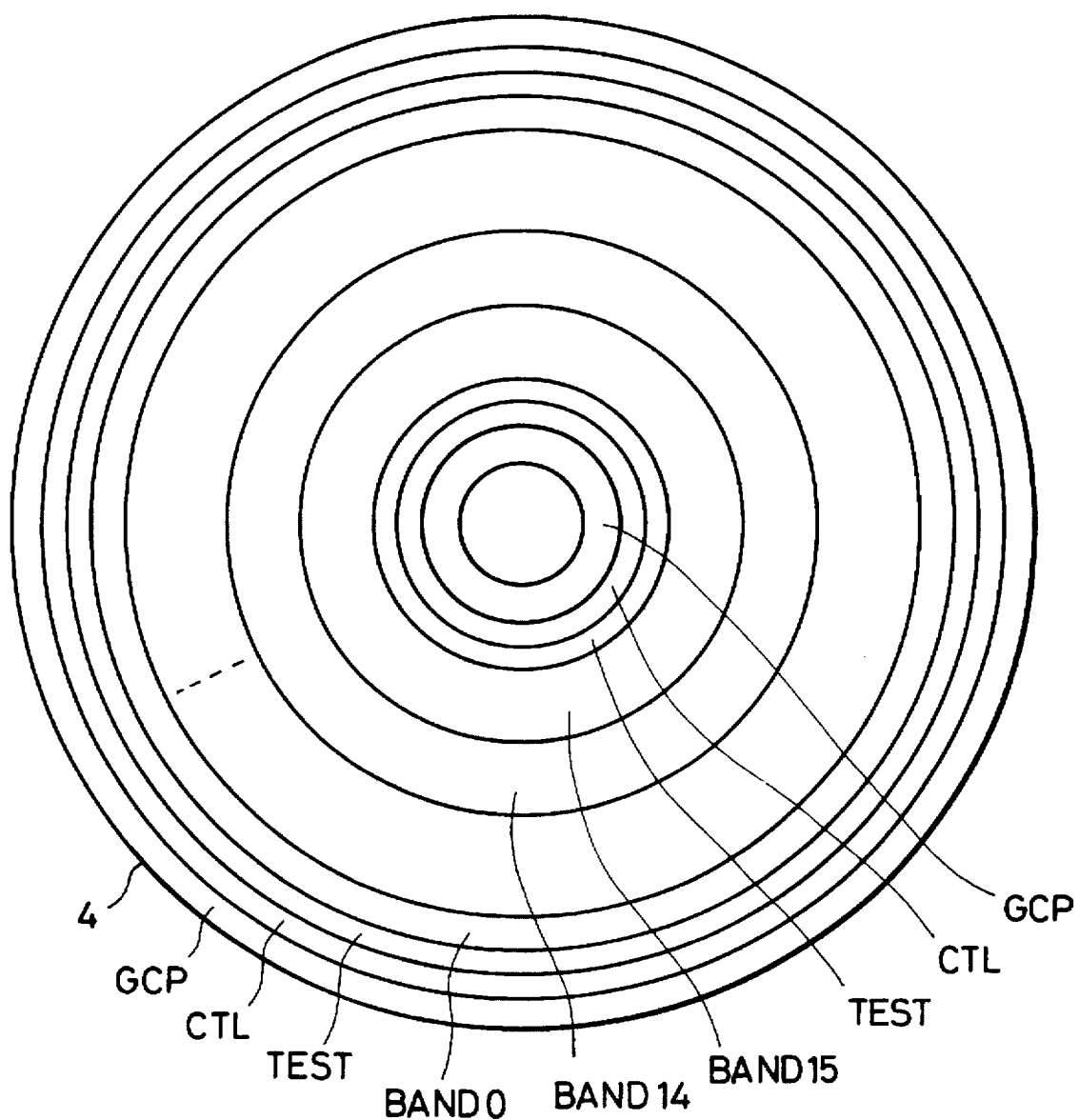

FIG. 5

| Name of Region | Starting Radius | Ending Radius | Data Clock |
|---|---|---|---|
| GCP Region | 41.9980 | 41.2180 | 24.192MHz |
| Control Region | 41.2144 | 41.2096 | 24.192MHz |
| Test Region | 41.2060 | 41.2012 | 24.192MHz |
| Band 0 | 41.2000 | 41.1836 | 24.192MHz |
| Band 1 | 39.1824 | 39.1468 | 23.688MHz |
| Band 2 | 38.1456 | 38.0908 | 23.184MHz |
| Band 3 | 37.0896 | 36.9964 | 22.680MHz |
| Band 4 | 36.9952 | 35.8636 | 21.672MHz |
| Band 5 | 35.8624 | 34.6924 | 21.168MHz |
| Band 6 | 34.6912 | 33.4636 | 20.160MHz |
| Band 7 | 33.4624 | 32.1964 | 19.656MHz |
| Band 8 | 32.1952 | 30.8524 | 18.648MHz |
| Band 9 | 30.8512 | 29.4316 | 17.640MHz |
| Band 10 | 29.4304 | 27.9724 | 17.136MHz |
| Band 11 | 27.9712 | 26.4172 | 16.128MHz |
| Band 12 | 26.4160 | 24.7468 | 15.120MHz |
| Band 13 | 24.7456 | 22.9612 | 14.112MHz |
| Band 14 | 22.9600 | 20.9260 | 12.600MHz |
| Band 15 | 20.9248 | 20.0020 | 12.096MHz |
| Test Region | 20.0008 | 19.9960 | 12.096MHz |
| Control Region | 19.9924 | 19.9876 | 12.096MHz |
| GCP Region | 19.9840 | 19.0000 | 12.096MHz |

FIG. 8

| i \ j | 0 | 1 | ... | 7 | 8 | 9 | 10 | 11 | 12 | 13 | 14 | 15 |
|---|---|---|---|---|---|---|---|---|---|---|---|---|
| 130 | D0 | D1 | | D7 | D8 | D9 | D10 | D11 | D12 | D13 | D14 | D15 |
| 129 | D16 | D17 | | D23 | D24 | D25 | D26 | D27 | D28 | D29 | D30 | D31 |
| 128 | D32 | D33 | | D39 | D40 | D41 | D42 | D43 | D44 | D45 | D46 | D47 |
| 127 | D48 | D49 | | D55 | D56 | D57 | D58 | D59 | D60 | D61 | D62 | D63 |
| 126 | D64 | D65 | | D71 | D72 | D73 | D74 | D75 | D76 | D77 | D78 | D79 |
| 125 | D80 | D81 | | D87 | D88 | D89 | D90 | D91 | D92 | D93 | D94 | D95 |
| 124 | D96 | D97 | | D103 | D104 | D105 | D106 | D107 | D108 | D109 | D110 | D111 |
| 123 | D112 | D113 | | D119 | D120 | D121 | D122 | D123 | D124 | D125 | D126 | D127 |

147

Code Word

FIG. 9

| j | 0 | 1 | --- | 7 | 8 | 9 | 10 | 11 | 12 | 13 | 14 | 15 |
|---|---|---|---|---|---|---|---|---|---|---|---|---|
| 4 | D2016 | D2017 | | D2023 | D2024 | D2025 | D2026 | D2027 | D2028 | D2029 | D2030 | D2031 |
| 3 | D2032 | D2033 | | D2039 | D2040 | D2041 | D2042 | D2043 | D2044 | D2045 | D2046 | D2047 |
| 2 | U.D. | U.D. | | U.D. | U.D. | U.D. | U.D. | U.D. | U.D. | U.D. | U.D. | U.D. |
| 1 | U.D. | U.D. | | U.D. | U.D. | U.D. | U.D. | U.D. | U.D. | U.D. | U.D. | U.D. |
| 0 | U.D. | U.D. | | U.D. | CRC1 | CRC2 | CRC3 | CRC4 | CRC5 | CRC6 | CRC7 | CRC8 |
| −1 | E1.1 | E2.1 | | E8.1 | E9.1 | E10.1 | E11.1 | E12.1 | E13.1 | E14.1 | E15.1 | E16.1 |
| −2 | E1.2 | E2.2 | | E8.2 | E9.2 | E10.2 | E11.2 | E12.2 | E13.2 | E14.2 | E15.2 | E16.2 |
| −3 | E1.3 | E2.3 | | E8.3 | E9.3 | E10.3 | E11.3 | E12.3 | E13.3 | E14.3 | E15.3 | E16.3 |
| −4 | E1.4 | E2.4 | | E8.4 | E9.4 | E10.4 | E11.4 | E12.4 | E13.4 | E14.4 | E15.4 | E16.4 |
| −13 | E1.13 | E2.13 | | E8.13 | E9.13 | E10.13 | E11.13 | E12.13 | E13.13 | E14.13 | E15.13 | E16.13 |
| −14 | E1.14 | E2.14 | | E8.14 | E9.14 | E10.14 | E11.14 | E12.14 | E13.14 | E14.14 | E15.14 | E16.14 |
| −15 | E1.15 | E2.15 | | E8.15 | E9.15 | E10.15 | E11.15 | E12.15 | E13.15 | E14.15 | E15.15 | E16.15 |
| −16 | E1.16 | E2.16 | | E8.16 | E9.16 | E10.16 | E11.16 | E12.16 | E13.16 | E14.16 | E15.16 | E16.16 |

147 ↔ Code Word

| D0~D127(n-1) |
| D128~D255(n-2) |
| D256~D383(n-1) |
| D384~D511(n-2) |
| D512~D639(n-1) |
| ------- |
| D1792~D1919(n-1) |
| D1920~D2047(n-2) |

UD(n-1)

LDC(n-1)

Sn

| D0~D127(n) |
| D128~D255(n-1) |
| D256~D383(n) |
| D384~D511(n-1) |
| D512~D639(n) |
| ------- |
| D1792~D1919(n) |
| D1920~D2047(n-1) |

UD(n)

LDC(n)

Sn+1

| D0~D127(n+1) |
| D128~D255(n) |
| D256~D383(n+1) |
| D384~D511(n) |
| D512~D639(n+1) |
| ------- |
| D1792~D1919(n+1) |
| D1920~D2047(n) |

UD(n+1)

LDC(n+1)

RECORD MEDIUM, AND METHOD FOR RECORDING TO AND REPRODUCING FROM A RECORD MEDIUM

BACKGROUND OF THE INVENTION

The present invention relates to a record medium such as an optical disk, a compact disk, and so forth, and method for recording to and reproducing from a record medium which is used in, for example, a magneto-optical disk drive.

Currently, there are a variety of different types of optical disks, including magneto-optical disks, "phase changing" optical disks, write-once disks, read-only memory compact disks (CD-ROMs), etc. These and other types of optical disks generally can be classified either as writable-type disks or read-only-type disks.

Upon certification or testing of a writable magneto-optical disk during or after manufacture thereof, if a defective sector is detected on the disk, the data originally recorded on the defective sector is re-recorded on a sector adjacent to the defective sector and data that identifies the existence and location of the defective sector is recorded on a predefined area of the magneto-optical disk. During reproduction of the magneto-optical disk, the sector adjacent to the defective sector is reproduced. Similarly, when data is recorded on a magneto-optical disk in, for example, a consumer magneto-optical disk drive, if a sector on which data is to be recorded is found to be defective, the data instead is recorded in a separate region used exclusively as a substitute area for defective sectors. Of course, a CD-ROM is a read-only record medium and, therefore, cannot be recorded on by, for example, an optical disk drive except during the manufacture thereof.

When data is recorded on a magneto-optical disk or on a CD-ROM during the manufacture thereof, or when data is recorded on a magneto-optical disk by an optical disk drive, error detection and error correction data also generally are recorded on each disk so that errors which occur during the reproduction of the recorded data can be detected and corrected in the reproducing device.

One type of error-correcting data is known as a Reed-Solomon code. This code provides for multiple error correction and defines code symbols from n-bit bytes or symbols (e.g., eight bits per symbol). When original data is comprised of k symbols, parity is added to the k-symbol data to produce a code of n symbols. As is known, a "minimum distance" in Reed-Solomon codes indicates the amount of error correction of which the code is capable.

For example, when one symbol is comprised of one bit, n symbols are represented by n bits, and a data series of the n symbols (i.e., n bits) can have $2^n$ different values (referred to as a "$2^n$ data series"). Similarly, a series of the original k symbols can have $2^k$ different values (referred to as a "$2^k$ data series"). If the $2^k$ data series is extracted from the $2^n$ data series, the number of different bits d between two series of data which have been arbitrarily taken out is known as the "distance." That distance d which similarly is obtained for all of the different $2^k$ data series is known as the "minimum distance." In the following discussion, for purposes of convenience, references to "distance" refer to "minimum distance."

In general, the distance d of a data code and the number of errors t1 that can be corrected have a relationship as shown in Equation 1.

$$d \geq 2 \cdot t1 + 1 \tag{1}$$

For example, if the distance d for a particular code is 17, then errors that occur in up to eight symbols can be corrected.

Reed-Solomon codes also provide error detection capability. For example, if t2 represents the number of errors that can be detected using Reed-Solomon codes, the amount of error detection capability (t2) is expressed as shown in Equation 2.

$$t2 = d - (2 \cdot t1 + 1)(t2 \geq 0) \tag{2}$$

Table 1 below illustrates the different values of t1 and t2 when the distance d equals 17.

TABLE 1

| 0 symbol correction | t1 = 0 | t2 = 16 |
| 1 symbol correction | t1 = 1 | t2 = 14 |
| 2 symbol correction | t1 = 2 | t2 = 12 |
| 3 symbol correction | t1 = 3 | t2 = 10 |
| 4 symbol correction | t1 = 4 | t2 = 8 |
| 5 symbol correction | t1 = 5 | t2 = 6 |
| 6 symbol correction | t1 = 6 | t2 = 4 |
| 7 symbol correction | t1 = 7 | t2 = 2 |
| 8 symbol correction | t1 = 8 | t2 = 0 |

As is apparent, the value of distance d must be increased for the number of errors that can be corrected to increase. In addition, an LDC (long distance code) of (n, k, d) for a large value of distance d provides for a relatively large amount of data.

In the above example, it is possible to correct eight symbol errors when distance d is 17. The types of such errors generally may be random errors and/or burst errors. However, the occurrence of a burst error may result in a number of erroneous symbols greater than the number of symbols that can be corrected using Reed-Solomon codes of a predetermined distance.

One known method of correcting burst errors is to provide on one or more tracks a parity sector. Here, an exclusive-or of data stored on one or more tracks is utilized as the parity data. When a burst error occurs, both error detection and error correction are accomplished using the parity data stored in the parity sector.

One difficulty encountered using the above-described methods of detecting and correcting errors is the general inability to process data in real time. For example, the utilization of a parity sector causes an excessive delay in the reproduction of data because there is a "two-fold" reproduction and error detection/correction process when a burst error occurs: (1) the original data is reproduced and error corrected; and (2) the data stored in the parity sector is reproduced and error corrected.

In addition, increasing the distance d of the code to increase the error detection/correction capability of a reproducing device causes a substantial increase in the amount of Reed-Solomon codes.

Another problem with the above-described methods is that the added error correction code, which may be in the form of a parity sector or increased Reed-Solomon codes, causes a reduction in the recording capacity of the record medium.

OBJECTS OF THE INVENTION

Therefore, it is an object of the present invention to provide record medium and method for recording to and reproducing from a record medium which overcome the shortcomings of the above-described methods.

Another object of the present invention is to provide a recording format of a record medium and method for recording data in that format to and reproducing data in that format from a record medium in which the affect of a burst error can be minimized.

A further object of the present invention is to provide a recording and reproducing technique which minimizes the affect of a burst error without decreasing the recording capacity of a record medium.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, method of recording data on a record medium is provided for receiving a series of data elements each having a plurality of data, adding error detection and error correction data to each of the data elements, moving some of the data in each of the data elements to a respectively different and adjacent data element so as to produce arranged data elements, and recording each of the arranged data elements in a respectively different region or sector on a record medium.

As one aspect of the present invention, each received pair of data elements includes an odd-numbered data element and an even-numbered data element, and some of the data in the respective odd-numbered and even-numbered data elements in each pair are swapped.

As another aspect of the present invention, each data element is divided into a succession of data units, and alternate data units in each data element are moved to a respectively different data element.

In accordance with another embodiment of the present invention, method of reproducing data from a record medium is provided for reproducing from a record medium a series of arranged data elements having error detection and error correction data, moving some of the data in each arranged data element to a respectively different arranged data element to produce rearranged data elements, detecting and correcting errors in each of the rearranged data elements in accordance with the error detection and error correction data contained in the respective rearranged data element, and supplying the error corrected rearranged data elements as an output.

In accordance with a further embodiment of the present invention, method of reproducing data from a record medium is provided for reproducing from a record medium at least two arranged data elements having error detection and error correction data, identifying in each of the reproduced arranged data elements that data which pertains to a single rearranged data element, storing in a memory that data included in each of the reproduced arranged data elements that is identified as pertaining to the single rearranged data element to produce the single rearranged data element, detecting and correcting errors in the single rearranged data element stored in memory, and supplying the error corrected single rearranged data element as an output.

In accordance with yet another embodiment of the present invention, method of reproducing data from a record medium which has read-only regions and/or writable regions is provided for identifying the record medium as a read-only record medium, a writable record medium or a hybrid record medium which has both read-only and writable regions, identifying the read-only regions and the writable regions of the record medium when the record medium is identified as a hybrid record medium, reproducing from a selected region of the record medium arranged data elements having error detection and error correction data, moving when the selected region is a read-only region some of the data in each arranged data element to a respectively different arranged data element to produce rearranged data elements, providing when the selected region is a writable region each of the arranged data elements as rearranged data elements, detecting and correcting errors in each of the rearranged data elements in accordance with the respective error detection and error correction data contained therein, and supplying the error corrected rearranged data elements as an output.

In accordance with yet a further embodiment of the present invention, record medium is provided which has a read-only area having a plurality of sectors at which data including error detection and error correction data is stored. Some of the data in each of the sectors correspond to the respective sector and other data in each of the sector correspond to a different sector. The error detection and error correction data in each of the sectors corresponds to data in the respective sector and to data in a different sector.

In accordance with still another embodiment of the present invention, record medium is provided which has a series of data recorded thereon and which comprises a plurality of concentric tracks that are located between an outer periphery and an inner periphery of the record medium. Each of the concentric tracks has a plurality of equal angular-sized servo areas which have pit patterns for providing tracking and clock control and each of the servo areas on each of the tracks is followed by a plurality of data segments in which user data is recorded. The user data also is partitioned into a plurality of sectors each of which includes a plurality of data segments. Each sector includes data which pertains to the respective sector, user data which pertains to an adjacent sector, and parity data which corresponds to the user data which pertains to the respective sector located in the respective sector and user data which pertains to the respective sector located in the other adjacent sector.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIGS. 2A to 2D illustrate the format of the servo area of address and data segments on a magneto-optical disk of the present invention;

FIG. 4 illustrates the various regions of an optical disk;

FIG. 5 is a table which identifies the location and data clock rate of each of the regions of the optical disk shown in FIG. 4;

FIGS. 8 and 9 illustrate an exemplary data structure of a sector of an optical disk in accordance with the present invention;

FIG. 12 shows a specific example of the data structure of sectors whose data structure are broadly shown in FIG. 11;

DETAILED DESCRIPTION OF CERTAIN PREFERRED EMBODIMENTS

Figure 1:
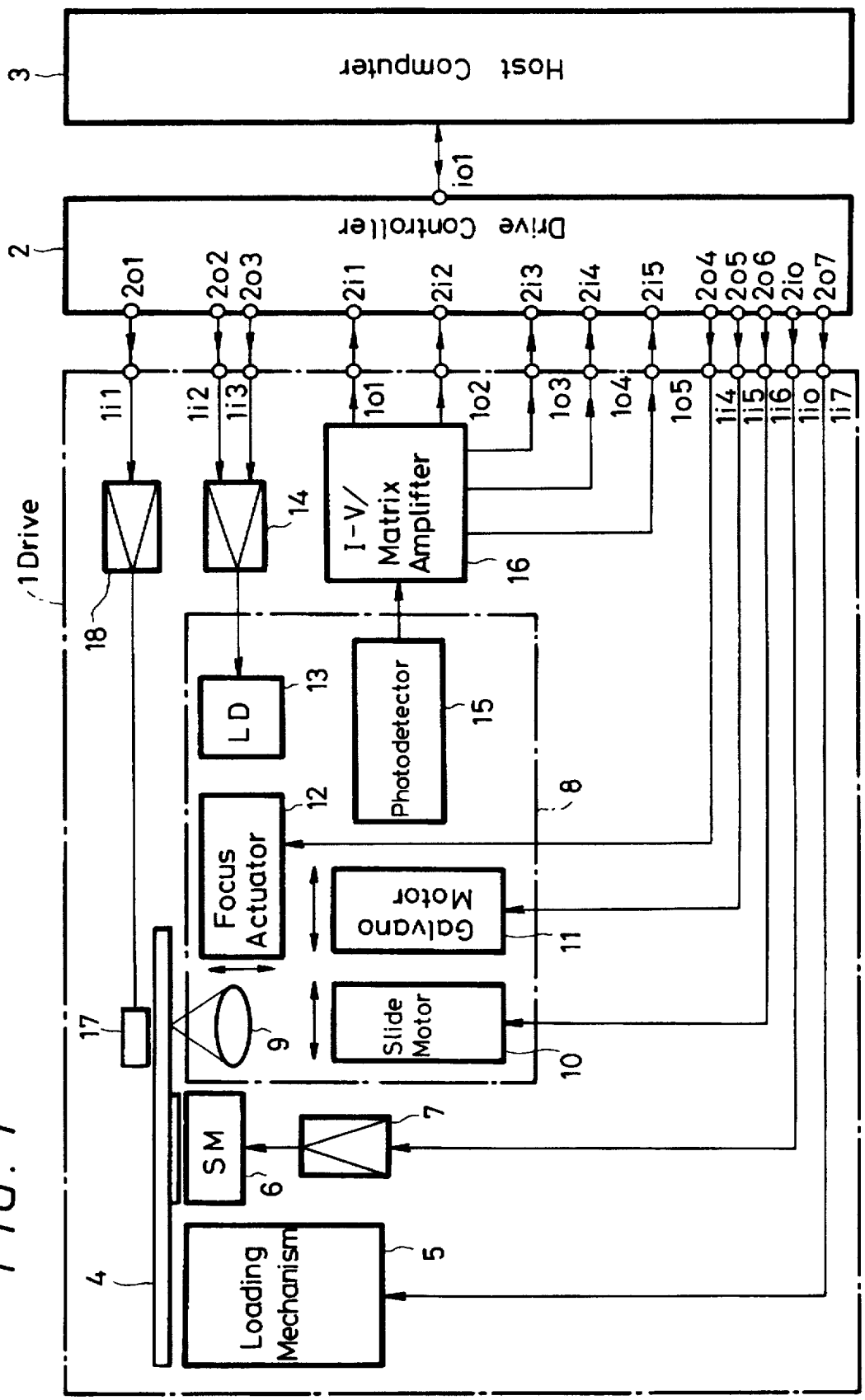
FIG. 1 is a block diagram of an optical disk drive which carries out the method of recording to and reproducing from a record medium in accordance with the present invention.

Referring now to the drawings, FIG. 1 is a block diagram of an optical disk drive which carries out the method of recording to and reproducing from a record medium in accordance with present invention. The optical disk drive includes a drive unit 1 for recording data to and reproducing data from an optical disk 4 (e.g., a magneto-optical disk) and a drive controller 2 which controls the drive unit. A host computer 3 is coupled to the drive controller at an input/output (I/O) terminal io1 (e.g., a SCSI-small computer systems interface) so as to access data stored on optical disk 4 via drive 1 and drive controller 2.

The optical disk drive of FIG. 1 generally is capable of: recording data to and reproducing data from a magneto-optical disk and a write-once type disk; reproducing data from a read-only disk (e.g., CD-ROM); recording data to and reproducing data from a writable region of a hybrid (or partial) read-only memory having both writable and read-only regions; and reproducing data from the read-only regions of a hybrid-type disk. As is appreciated, data is recorded on read-only disks and on the read-only regions of hybrid disks during manufacture thereof. Furthermore, for purposes of the present invention, optical disk 4 may be a magneto-optical disk, a "phase change media" optical disk, a write-once disk, a hybrid disk which has both a writable region (RAM) and a read-only region (ROM), a CD-ROM, etc.

Drive 1 is comprised of a loading mechanism 5 which loads optical disk 4 therein, a spindle motor 6 which rotates optical disk 4, a driver 7 which drives spindle motor (SM) 6, an optical block 8 (to be described), a driver 14 which drives a laser diode (LD) 13 located in optical block 8, and I–V/matrix amplifier 16 which converts a reproduced signal supplied from optical block 8 into I–V (current/voltage) form and which supplies this signal to drive controller 2, a magnetic head 17 which provides a magnetic field to optical disk 4, and a driver 18 which drives magnetic head 17.

Optical block 8 is comprised of an objective lens 9 which radiates laser light from laser diode 13 onto optical disk 4, a slide motor 10 which moves optical block 8 in a radial direction of optical disk 4, a galvano-motor 11 which provides tracking by turning a galvano-mirror (not shown) that reflects the laser beam onto the optical disk, a focus actuator 12 which focuses the laser light and laser diode 13 which produces the laser light.

Various drive and control signals are supplied to drive 1 via input terminals $1i1$–$1i7$ from drive controller 2 through the output terminals thereof ($2o1$–$2o7$), as follows. Drive controller 2 supplies drive signals to: driver 18 (via terminal $1i1$) which drives magnetic head 17; driver 14 (via terminals $1i2$ and $1i3$) which drives laser diode 13; focus actuator 12 (via terminal $1i4$) which focuses the laser light; galvano-motor 11 (via terminal $1i5$) which provides tracking; slide motor 10 (via terminal $1i6$) which moves optical block 8; driver 7 (via terminal $1io$) which drives spindle motor 6; and loading mechanism 5 (via terminal $1i7$) which loads the optical disk. I–V/matrix amplifier 16 supplies various signals to drive controller 2 via output terminals $1o1$–$1o5$ of drive 1 and terminals $2i1$–$2i5$ of drive controller 2, to be described.

FIGS. 2–5 schematically illustrate a data format of optical disk 4 to which data is recorded and from which data is reproduced by the optical disk drive shown in FIG. 1. During manufacture, concentric recording tracks are sequentially formed on the optical disk from the outer to the inner peripheries thereof, and plural servo areas (SA) are formed on each of the tracks at predetermined angles thereof. FIGS. 3A and 3B illustrate the format of the recording tracks of the optical disk, to be further described, and FIGS. 2A to 2D illustrate the structure of four different servo areas formed on each track.

Figure 3A:
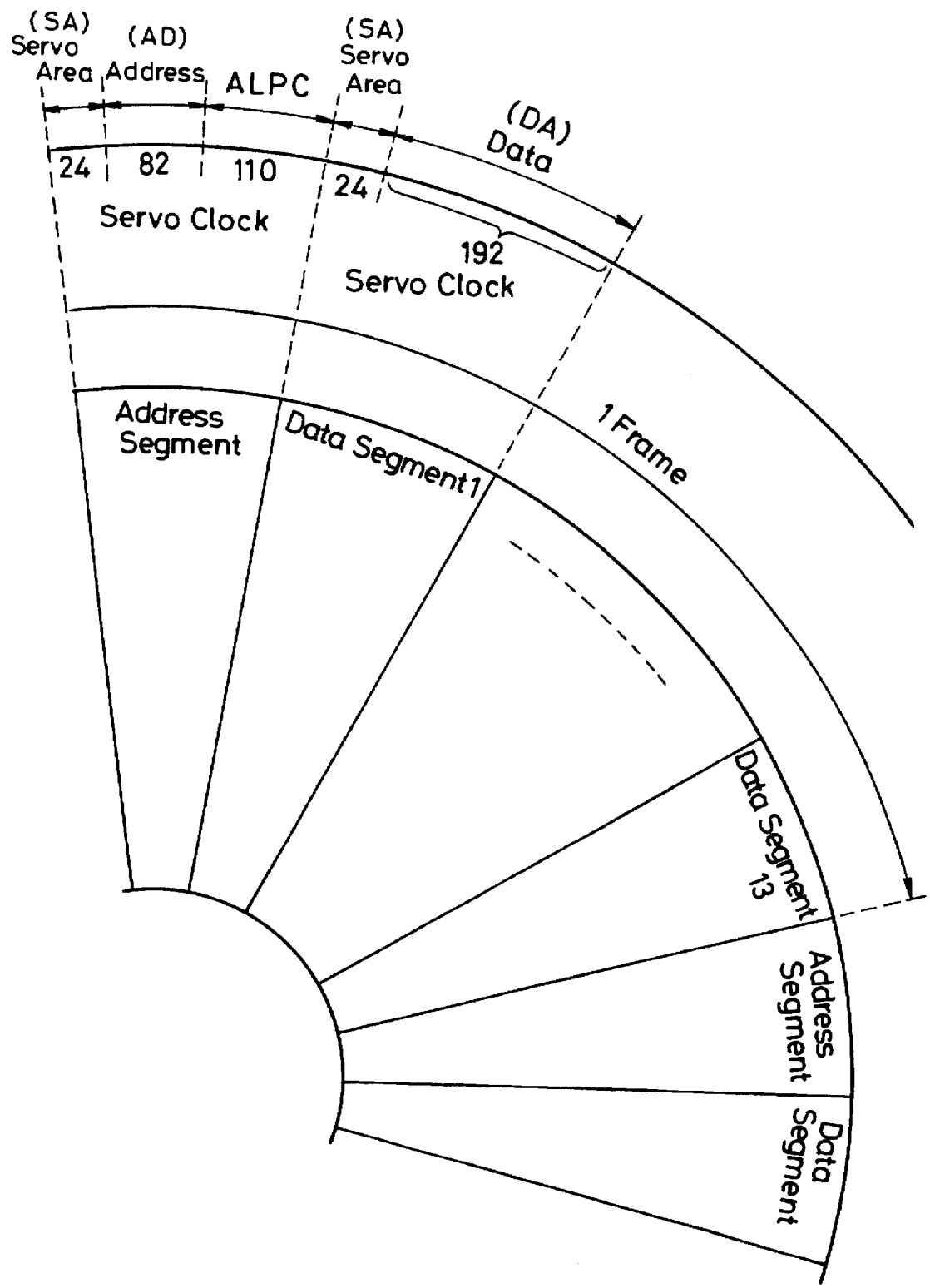
FIGS. 3A and 3B illustrate the data structure of tracks on a record medium in accordance with the present invention.

Referring first to FIG. 3A, each track is divided into 100 frames and each frame includes an address segment and 13 data segments, for a total of 1400 segments (address and data) per track. Each segment has a length of 216 servo clocks. Each of the address and data segments includes a servo area (SA) at the beginning thereof so as to provide tracking control based on the servo pattern (i.e., pit-pattern) of the respective servo area, further described below.

FIG. 2B schematically illustrates the pit-pattern of the servo area SA of each of the address segments on each of the tracks. As shown, an address mark (AM) (i.e., pit) is formed during manufacture of the disk at a position AR1 and wobble pits (WP) are formed at particular respective positions so as to provide proper tracking, as will be further discussed below. Following the servo area of each address segment is an address area (FIG. 3A) in which address data AD is recorded during manufacture of the optical disk. The address data identifies the radial position of the track (i.e., the track number) as well as the tangential (i.e., angular) position of the frame in which the address sector is located (i.e., the frame within the track). Following the address area of each address segment is an auto laser power control (ALPC) area in which data is recorded which provides for the upward adjustment of the amount of laser light from laser diode 13.

FIGS. 2A, 2C and 2D schematically illustrate the pit-patterns of each of three different data servo areas SA that may be formed at the beginning of each of the data segments. As shown, the data servo area of a data segment includes either a segment mark (SM), a sector flag 1 mark (SF1) or a sector flag 2 mark (SF2) formed at a position AR4, AR2 and AR3, respectively. In addition, wobble pits (WP) are formed at positions similar to those formed in the servo area of each address segment. Each of the three different data servo areas shown in FIGS. 2A, 2C and 2D is further discussed below.

In addition to dividing each track into plural segments, the entire recording area of optical disk 4 is divided into plural concentric zones, also known as bands, and each zone includes plural concentric recording tracks. FIG. 4 schematically illustrates optical disk 4 divided into various zones including, from the outer periphery to the inner periphery of the disk, a Gray code part (GCP) band, a control (CTL) region (i.e., band), a test (TEST) region, a first band (BAND 0) through a fifteenth band (BAND 15), and another test (TEST) region, control (CTL) region and Gray code part (GCP) band.

Generally, each of the GCP bands includes data which identifies the type of the disk and the address or location of each of the zones on the disk, and includes a pit pattern formed of a Gray code. The GCP bands further are arranged so that they can be reproduced when optical block 8 in the optical disk drive crosses the various tracks on optical disk 4. Each of the CTL regions generally includes data which identifies the type of record medium and the TEST regions are utilized for testing purposes. BAND 0 through BAND 15 are known as user zones (e.g., video data, audio data, etc.) on which user data is recorded.

FIG. 5 is a table which identifies the starting and ending radial positions of each of the zones of optical disk 4 and the clock frequency at which data is recorded in each of those zones. As shown, the clock frequency at which data is recorded is the same for each of the first three zones nearest the outer periphery (24.192 MHz) and is the same for each of the three zones nearest the inner periphery (12.096 MHz). In addition, the data clock frequency increases with each band 15 through band 0 as the outer periphery is approached. Bands 0–14 have the same data recording capacity since the data clock rates are selected to correspond to the starting and ending radial positions of those bands. The data clock rate is generated in the optical disk drive shown in FIG. 1 from a servo clock which is derived from the wobble pits in the servo patterns in each of the segments, to be further described. The servo clock additionally is utilized for producing sampling pulses for purposes of proper focusing, tracking and detecting of address codes. It is noted that within each zone, the angular recording density is constant and, therefore, the timing of the sampling pulses also is constant and not dependent on the radial position of a track.

Figure 3B:
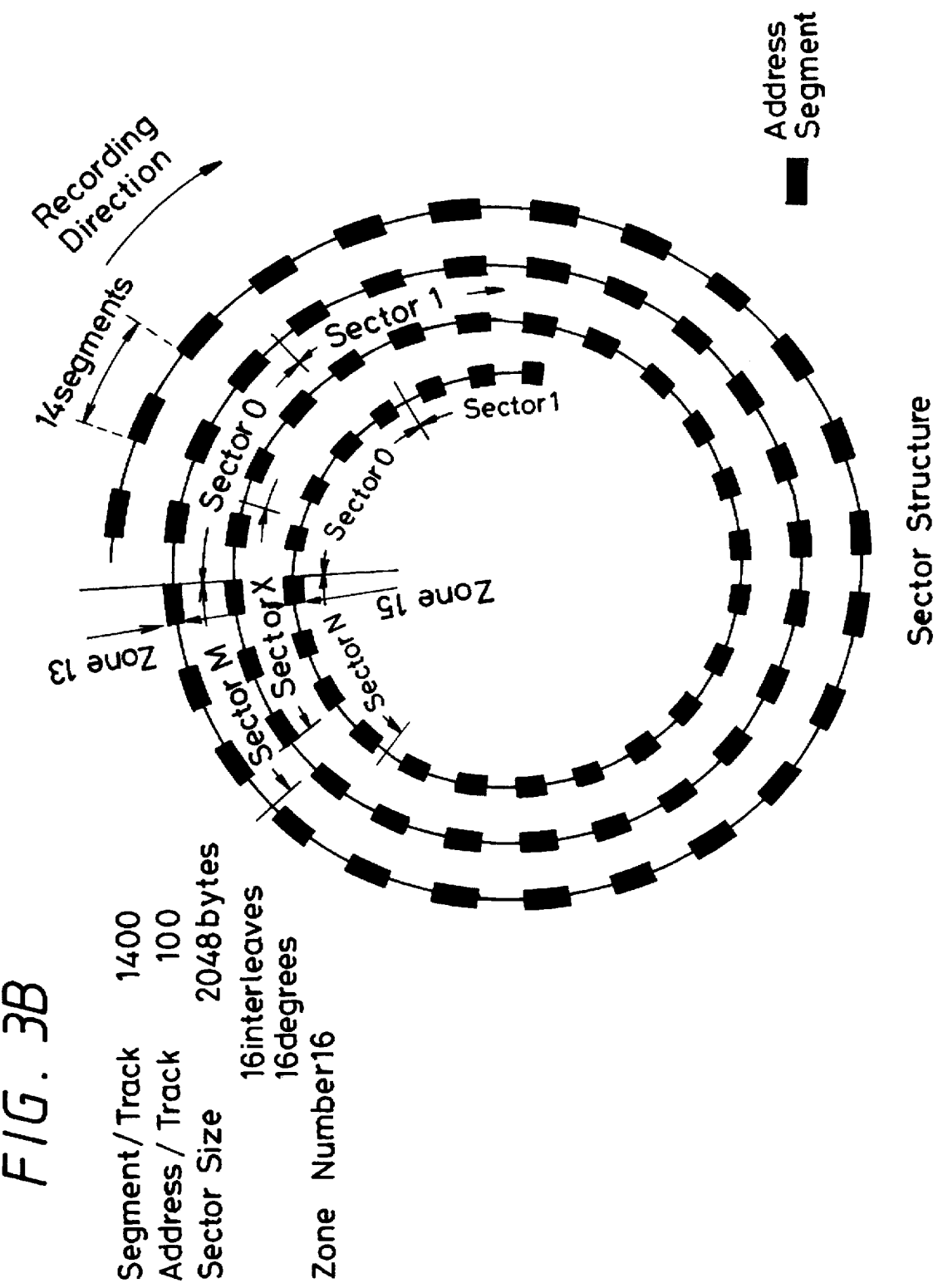

In addition to the above-described data structure, each track further is divided into plural sectors which store the same amount of data (e.g., 2 kilobytes). Each sector is comprised of plural segments. Since the amount of data recorded in each segment in a track decreases when the respective track approaches the inner periphery of the optical disk, the number of segments included in each sector of a track increases as the respective track approaches the inner periphery of the optical disk. FIG. 3B schematically illustrates the relationship between each of the sectors in the various tracks and the number of segments contained in those sectors. As shown, sector 0 on a track located in zone 13 includes less address segments (and, therefore, less total segments) than sector 0 on a track located in zone 15. Furthermore, it is shown that each sector does not necessarily include only entire frames of data (i.e., each and every one of the 14 segments of a frame). Rather, the beginning of a sector may coincide with the beginning of any of the segments in a frame, to be further discussed.

Figure 6:
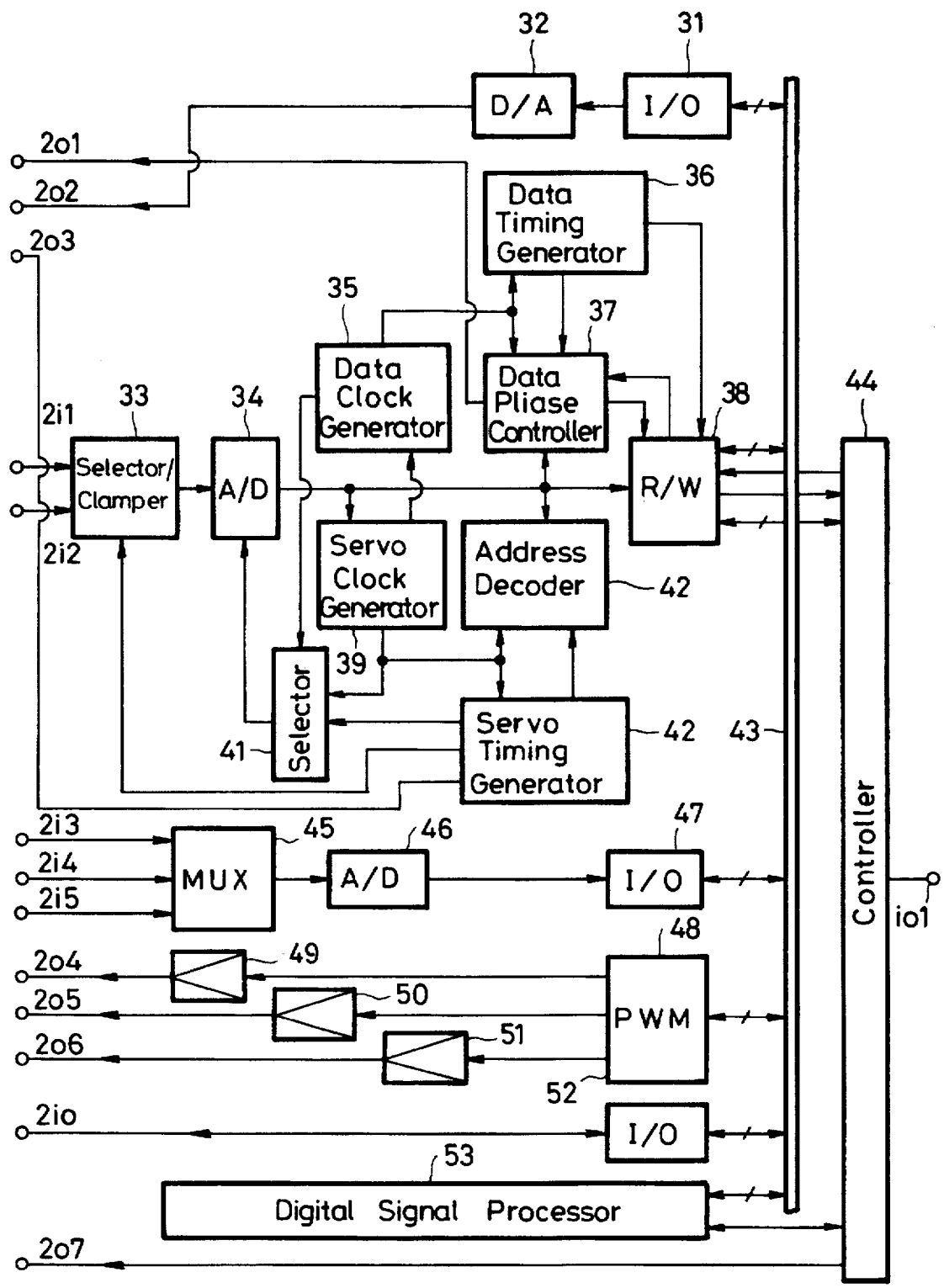
FIG. 6 is a block diagram of disk drive controller 2 shown in FIG. 1.

Referring now to FIG. 6, a block diagram of drive controller 2 shown in FIG. 1 is shown. Drive controller 2 is comprised of input/output (I/O) circuits 31, 47 and 52, a D/A convertor 32, a select/clamping circuit 33, A/D convertors 34 and 46, a data clock generating circuit 35, a data timing generating circuit 36, a data phase controller 37, a read/write (R/W) circuit 38, a servo clock generating circuit 39, a servo timing generating circuit 40, a selector 41, an address decoder 42, a bus 43, a controller 44, a multiplexer 45, a pulse width modulating (PWM) circuit 48, drivers 49, 50, 51, and a digital signal processing circuit 53.

When optical disk 4 is loaded by loading mechanism 5 on spindle motor 6, or when an automatic "spin-up" mode is initiated after optical disk 4 is loaded, host computer 3 controls via controller 44 digital signal processing circuit 53 to initiate the rotation of spindle motor 6. Digital signal processing circuit 53 supplies via bus 43, I/O circuit 52 and terminal 2io a control signal to driver 7 which drives spindle motor 6 to rotate optical disk 4. When the rotational speed of spindle motor 6 reaches a predetermined velocity, driver 7 supplies via I/O circuit 52 a "lock" signal back to digital signal processing circuit 53. Digital signal processing circuit 53 also supplies during this time a control signal to PWM circuit 48 which modulates the control signal and which supplies a drive signal to driver 50 which via terminal 2o5 drives galvano-motor 11 to position the laser beam from laser diode 13 outside the user area of optical disk 4. Digital signal processing circuit 53 further provides via PWM circuit 48 to driver 51 a control signal to move optical block 8 to the outer or inner periphery of optical disk 4. Since the focusing of laser light may affect data recorded in the user area of optical disk 4, this undesirable effect is prevented by focusing the laser light initially outside the user area of the disk.

When spindle motor 6 obtains a predetermined constant velocity and optical block 8 has moved to, for example, the outer periphery of the disk, digital signal processing circuit 53 sets the bias current of laser diode 13 by supplying a bias control signal and a laser diode on/off signal to driver 14 via I/O circuit 31, D/A circuit 32 and terminal 2o2, and via servo timing generating circuit 40 and terminal 2o3, respectively. Driver 14 then drives laser diode 13 to emit laser light. The laser light (i.e., laser beam) emitted from laser diode 13 is reflected from disk 4 to photo detector 15 in optical block 8 which converts the laser light into an electric signal and which supplies the electric signal to I–V/matrix amplifier 16. When the laser beam is incident on the ALPC area of an address segment of a track (see FIG. 3A), photo detector 15 produces an electric signal proportional thereto. I–V/matrix amplifier 16, in response to the electric signal, supplies an ALPC signal, a focus error signal, and a pull-in signal to multiplexer 45 via terminals 1o3 and 2i3, 1o4 and 2i4, and 1o5 and 2i5, respectively. Multiplexer 45 multiplexes, in a time division manner, the received signals and supplies the ALPC signal (among others) to A/D converter 46 which digitizes the signal and which supplies the digitized ALPC signal via I/O circuit 47 and bus 43 to digital signal processing circuit 53. Digital signal processing circuit 53 ascertains from the digitized ALPC signal the amount of light emitted from laser diode 13 and adjusts that amount of light by varying the control signal which is supplied to I/O circuit 31. That is, based on a calculation by a digital filter (not shown), the signal supplied via I/O circuit 31 and D/A converter 32 to driver 14 is adjusted until the laser diode power output is at an appropriate and constant level.

At this time, digital signal processing circuit 53 controls PWM circuit 48 to drive via driver 49 and terminal 2o4 focus actuator 12 to enter a focus search mode which drives focus actuator 12 in the upper and lower directions (e.g., toward and away from disk 4). In the focus search mode, focus actuator 12 changes the focus of the laser beam onto optical disk 4; the reflection of the beam being incident on the light-receiving surface of photo detector 15 which converts the incident light into an electric signal. In response to the electric signal, I–V/matrix amplifier 16 generates and supplies via terminals 1o4 and 2i4 the focus error signal to multiplexer 45 which supplies the focus error signal (among other signals) to A/D converter 46. A/D converter 46 digitizes the focus error signal and supplies the digitized signal through I/O circuit 47 to digital signal processing circuit 53 which, in response thereto, adjusts the focus control signal supplied to driver 49.

Upon stable and proper focusing, I–V/matrix amplifier 16 produces an RF signal which has a substantially constant amplitude (produced from the signal supplied from photo detector 15) that is supplied to selector/clamp circuit 33 via terminal 2i1. The selector/clamp circuit selects and clamps the RF signal and supplies the clamped RF signal to A/D converter 34.

Servo clock generating circuit 39 operates in a "free-run mode" to supply a clock signal, having a free-run frequency, which is supplied as a timing pulse to servo timing generator 40. The free-run frequency is divided by a predetermined value and coupled to selector/clamping circuit 33 to provide proper clamping of the RF signal. A/D converter 34 supplies the digitized RF signal to servo clock generating circuit 39 which detects the pit-pattern formed (during manufacture) on optical disk 4 by measuring the difference in amplitudes of the digitized RF signal. Clock generating circuit 39 determines whether the detected pit-pattern in the digitized RF signal corresponds to a pit-pattern of one of the servo areas, and upon detection of a servo area pit-pattern, clock generating circuit 39 controls clock selector 41 to "open" a time window corresponding to the position in the RF signal at which the next servo area pit-pattern is expected to occur. When servo clock generating circuit 39 detects this servo area pit-pattern a predetermined number of times, servo clock generating circuit 39 is considered to be "locked" to the servo area pit-pattern of optical disk 4. In addition, phase information is generated from the amplitude difference of each of the wobble bits (WB) (see FIGS. 2A–2D) at both edges thereof and the summed total of the amplitude differences provides correct tracking information so as to ensure proper tracking during reproduction.

When servo clock generating circuit 39 is locked to the servo area pit-pattern, the position of the various marks and flags (i.e., marks SM, AM and flags SF1, SF2) in the reproduced servo area is determined by ascertaining at which one of four predetermined positions, AR1, AR2, AR3 and AR4, the RF signal amplitude is maximum. When the RF signal is a maximum at position AR1, the mark is an address mark AM and the reproduced servo area is in an address segment. Since each frame begins with an address segment, frame synchronization is achieved by resetting a frame counter in servo clock generating circuit 39 at each detection of a mark at position AR1. Once servo clock generating circuit 39 continuously detects the address mark in the servo area of each address segment, frame synchronization is considered to be "locked." Servo clock generating circuit 39 then controls selector 41 to open a time window at each of the fourteen segments of each frame.

When frame synchronization is accomplished, the address data AD in the address area of each of the address segments is reproduced and supplied to address decoder 42 which decodes the reproduced data (which is stored in the form of pit-patterns in the address area) by comparing the pattern, which is formed as a Gray code at every four bits, with a Gray code table. The comparison is made with an inverted table depending on whether the least significant bit (LSB) of the upper four bits is a "1" or a "0."

The frame code, which is included in the address data, is stored in a frame counter in address decoder 42 which is incremented by one on each detection of an address segment, and the value in the frame counter is compared to the frame code reproduced from the address data of each of the address segments to ensure coincidence therebetween. Upon frame count synchronization, the frame code stored in the frame counter is supplied to digital signal processing circuit 53, for example by way of bus 43.

Digital signal processing circuit 53 ascertains the velocity of optical block 8 from the track addresses and controls slide motor 10 by supplying a control signal to driver 51 through PWM circuit 48 in order to move optical block 8 to a desired track on the optical disk, at which point, proper tracking is accomplished as follows.

A tracking data signal is produced from the difference between the amplitude values of the RF signals corresponding to each of the wobble points in a servo area. Digital signal processing circuit 53 supplies a tracking control signal via PWM circuit 48 to driver 50 which drives galvano-motor 11 of optical block 8. Here, fluctuations of low frequency components in the RF signal are controlled to effectively provide tracking control of the laser beam so that it is positioned at the central portion of a track on optical disk 4.

Referring again to FIGS. 2A to 2D, when servo clock generating circuit 39 detects a segment mark at position AR2 (sector flag 1 in FIG. 2C) in the servo area of a segment, i.e., when the RF signal amplitude is maximum at position AR2, the reproduced segment is determined to be a data segment that is located at the beginning of a sector. If the segment mark is located at position AR3 (sector flag 2 in FIG. 2D), the reproduced segment is determined to be a data segment that is located adjacent and prior to the first segment of a sector. Host computer 3 is operable to determine whether a particular segment is the first or last segment of a sector utilizing the address data of each segment and, therefore, it is possible to identify the first segment of each sector even when a sector mark (or segment mark) in a particular segment cannot be reproduced. Finally, if the segment mark is located at position AR4 (the segment mark SM in FIG. 2A), the reproduced segment is determined to be neither a first nor a last segment of a sector.

Data clock generating circuit 35 generates a data clock signal having a frequency a multiple number of times greater than the frequency of the servo clock signal which is produced by servo clock generating circuit 39. The data clock signal is supplied to data timing generating circuit 36 and read/write circuit 38. Read/write circuit 38 also is supplied with recording data from host computer 3 via controller 44 during a recording operation. Read/write circuit 39 scrambles each set of sector data to be recorded by adding (e.g., by means of an exclusive-OR function), for example, a random number of 127 periods in accordance with the equation $y=x^7+x+1$ so as to modulate the scrambled recording data to data of an RZI series in synchronism with the data clock. The value initially is set to "0" at each segment of data and a modulated signal is supplied via driver 18 to magnetic head 17 from data phase controller 37 (via terminal 2o1).

During a recording operation, magnetic head 17 generates a magnetic field in response to the modulated signal which is applied to the data area of a segment on optical disk 4. The data area is heated to a Curie temperature by the laser beam in order to record the data of the NRZI series.

During a reproduction operation, data reproduced from each data area, which is produced by photodetector 15 and I-V/matrix amplifier 16, is clamped at a predetermined potential in selector/clamping circuit 33. The clamped signal is digitized in A/D converter 34 and supplied to read/write circuit 38 which, in a digital filter therein, processes the digitized signal by performing Viterbi coding on the data of the NRZI series. The read/write circuit 38 further converts the data of the NRZI series into an NRZ system whose basic unit is a segment, descrambles the data to provide sector data, and converts the sector data into reproduced data. The reproduced data is supplied through controller 44 to host computer 3.

Figure 7:
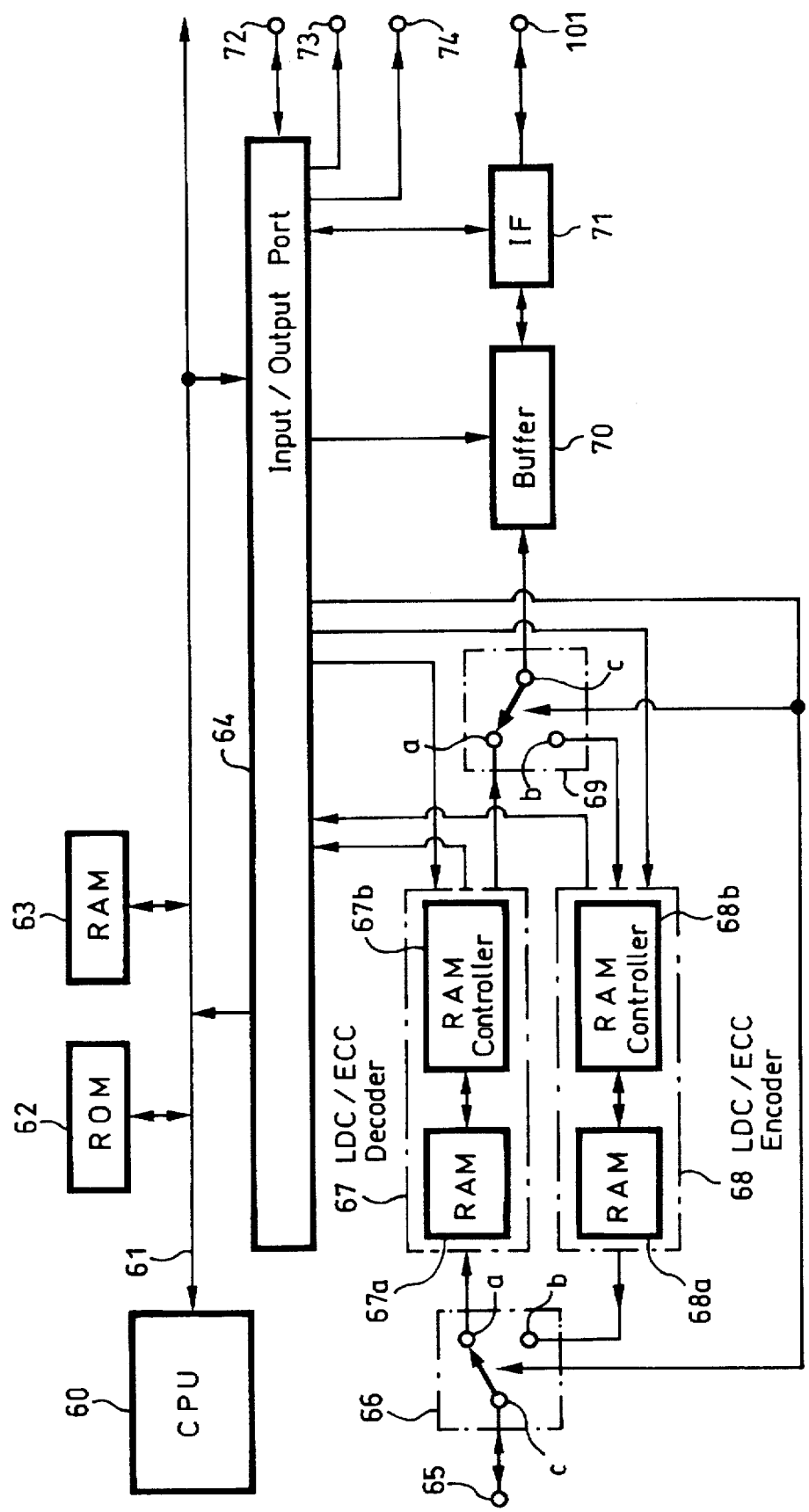
FIG. 7 is a block diagram of controller 44 shown in FIG. 6.

Referring now to FIG. 7, a block diagram of controller 44 shown in FIG. 6 is illustrated. Controller 44 is comprised of a central processing unit (CPU) 60, a bus 61, a read-only memory (ROM) 62, a random-access memory (RAM) 63, an input/output (I/O) port 64, switches 66, 69, an LDC/ECC decoder 67, an LDC/ECC encoder 68, a buffer 70 and an interface (IF) circuit 71. ROM 62 stores program data, parameter data, etc. and RAM 63 is utilized as a temporary work area for CPU 60. Each of LDC/ECC decoder 67 and LDC/ECC encoder 68 is comprised of a random access memory (RAM) 67a, 68a, respectively, each having a capacity to store two sectors' worth of data, and a RAM controller 67b, 68b, respectively.

A description of the operation of controller 44 when data is recorded on a writable magneto-optical disk or on a writable region of a partial (hybrid) disk will first be described. During a recording operation, host computer 3 supplies to CPU 60 a control signal by way of terminal io1, IF circuit 71, I/O port 64 and bus 61. In response to the control signal, CPU 60 supplies via I/O port 64 a switching control signal to switches 66 and 69 which connect their respective contacts b and c in response thereto. Data to be recorded is supplied from host computer 3 to buffer 70 which temporally stores the data therein. The data are transferred from buffer 70 through contacts b and c of switch 69 to LDC/ECC encoder 60 which adds error detection and error correction code. LDC/ECC encoder 68 supplies through contacts b and c of switch 66 and terminal 65 the data along with the error detection/correction code to read/write circuit 38 (FIG. 6). The data subsequently is recorded on optical disk 4, as previously discussed.

When data is supplied to LDC/ECC encoder 68, the encoder adds parity data to one of the two sectors supplied thereto and which are stored in RAM 68a. Upon completion of recording a sector, LDC/ECC encoder 68 supplies to CPU 60 via I/O port 64 a signal that indicates that the sector data is output therefrom. At this point, CPU 60 controls buffer 70, IF circuit 71 and read/write circuit 38 to process the data in the next sector.

When data is reproduced from optical disk 4, host computer 3 supplies a control signal to CPU 60 which in response thereto supplies a switching control signal via I/O port 64 to switches 66 and 69 which connect their respective contacts a and c. The reproduced data is supplied from read/write circuit 38 through terminal 65 and switch 66 to LDC/ECC decoder 67. When data is reproduced from a writable disk or from a writable region of a hybrid disk, LDC/ECC decoder 67 does not rearrange (to be described) the data and only performs error detection and correction on the reproduced data prior to supplying through switch 69 the error corrected data through switch 69 to buffer 70.

On the other hand, when data is reproduced from a read-only disk or from a read-only region of a hybrid disk, LDC/ECC decoder 67 rearranges the reproduced data in a manner to be described prior to performing error detection and error correction thereon.

As described above, LDC/ECC decoder 67 performs a converse function as that performed by LDC/ECC encoder 68 when data is reproduced from a writable disk or from a writable region of a hybrid disk. However, LDC/ECC decoder 67 performs the additional function of rearranging data reproduced from a read-only disk or from a read-only region of a hybrid disk. In the latter case, data contained in two sectors, which are reproduced and stored in RAM 67a, are rearranged (or "shifted") by RAM controller 67b to produce a single sector's worth of data, which is referred to as a "rearranged" sector. LDC/ECC decoder 67 performs error detection and correction on the rearranged sector using parity data contained therein and the error corrected and rearranged sector is supplied to buffer 70. At this time, LCD/ECC decoder 67 supplies to CPU 60 a signal that indicates that a sector is supplied thereout. CPU 60 then controls read/write circuit 38 and the accompanying circuits in the disk drive to reproduce and supply to LDC/ECC decoder 67 the next sector stored on optical disk 4. LDC/ECC decoder 67 stores in RAM 67a the reproduced sector with the sector already stored in RAM 67a (i.e., that sector that was previously reproduced) and repeats the above rearranging and error detecting/correcting process to produce another rearranged sector.

FIGS. 8 and 9 illustrate an exemplary data structure of a sector in accordance with the present invention wherein "i" represents a code word, "j" represents a byte of data such that each code word includes 16 bytes of data, and the horizontal arrow indicates the order in which data is recorded. As shown, each sector includes 2048 bytes of data (D0 to D2047), 40 undefined bytes (U.D.), 8 bytes of CRC code (CRC1 to CRC8) and 256 bytes of Reed-Solomon code (E1,1, E2,1, ... E16,16), for a total of 2352 bytes per sector. The CRC code represents parity for detecting errors in the entire data region which includes all of the data bytes D0 through D2047 and the undefined bytes, whereas the Reed-Solomon code in each column provides error detection/correction of data located in the respective column. That is, parities (E1,1), (E1, 2) ... (E1, 16) correspond to data D0, D16, D32 ... D2032 and the three undefined bytes corresponding to positions (j=0, i=2), (j=0, i=1) and (j=0, i=0); parities (E2,1), (E2, 2) ... (E2, 16) correspond to data D1, D17, D33 ... D2033 and the three undefined bytes corresponding to positions (j=1, i=2), (j=1, i=1) and (j=1, i=0), etc.

In the above exemplary data structure, each of the columns (j=0, 1 ... 15) shown in FIGS. 8 and 9 is comprised of 147 bytes wherein the data portion for producing the Reed-Solomon code (e.g., (E1,1), (E1,2) ... (E1,16)) is generated from the data portion of the column (e.g., D0, D16, D32 ... D2032, UD(i=2, j=0), UD(i=1, j=0), UD(i=0, j=0)) which has a length of 131 bytes and the parity length of the Reed-Solomon code of each column is 16 bytes. Therefore, the minimum distance is 17 to provide a Reed-Solomon code of (147, 131, 17).

Figure 10:
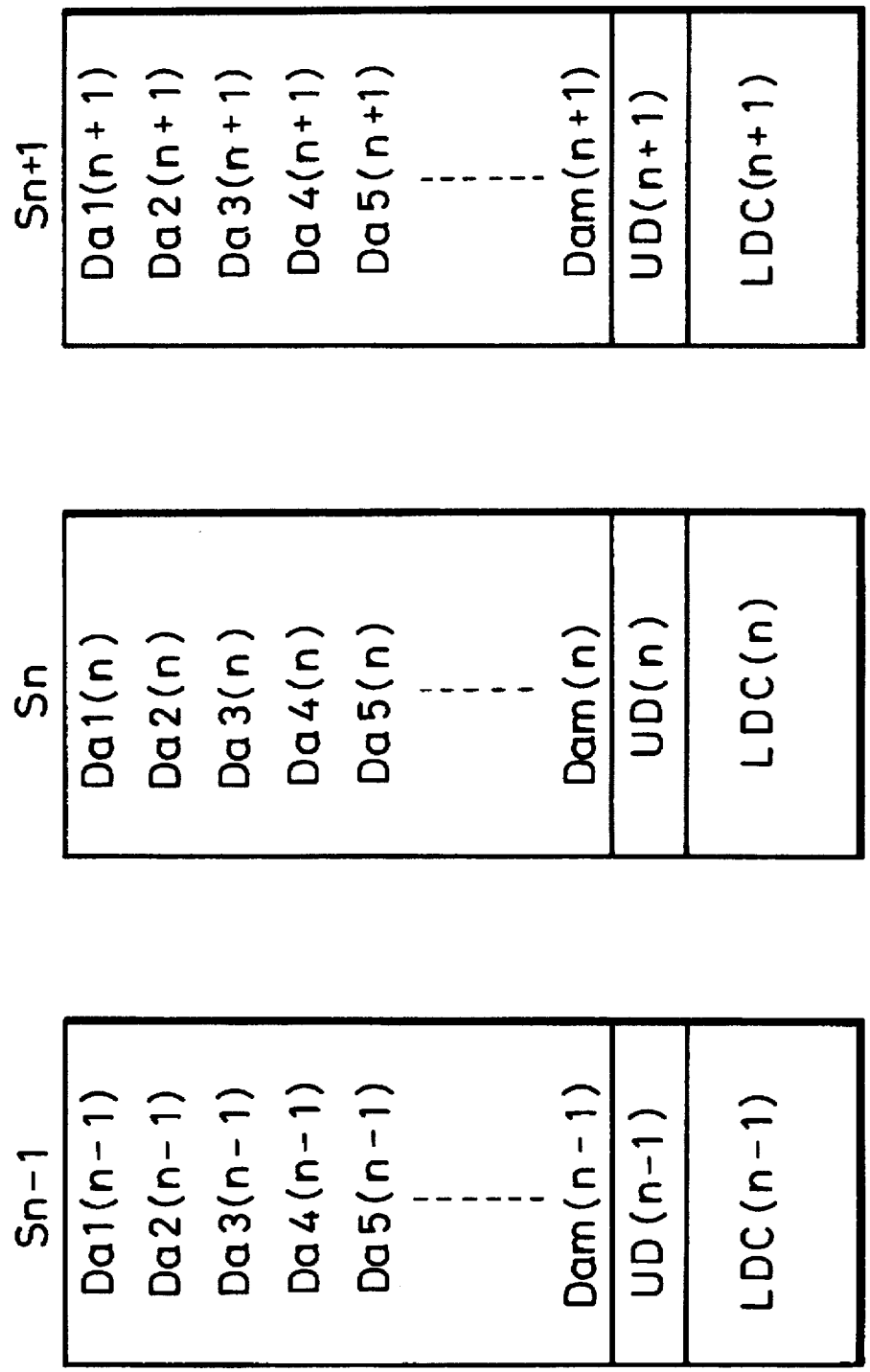
FIG. 10 illustrates the data structure of sectors in a writable region of an optical disk in accordance with the present invention.

FIG. 10 illustrates the data structure of adjacent sectors recorded in a writable region of an optical disk in accordance with the present invention. As shown, a recorded sector, e.g., sector $S_n$, located in a writable region of an optical disk includes data Da1(n), Da2(n) ... Dam(n) that represent data D0, D1 ... D2047 shown in FIGS. 8 and 9, undefined data UD(n) that represents both the undefined data (UD) and CRC parities CRC1 through CRC8, and a long distance code LDC(n) that represents parities (E1, 1) ... (E16, 16). Similarly, another sector $S_{n-1}$ recorded on a writable region of an optical disk includes all of the data, Da1(n−1), Da2(n−1) ... Dam(n−1), UD(n−1) and LDC(n−1). In other words, sector data is recorded in the same order (i.e., arrangement) in which it is supplied from the host computer. Of course, parity data is added to each sector in LDC/ECC encoder 68, previously discussed. In addition, data in adjacent sectors $S_{n-1}$, $S_n$ and $S_{n+1}$ shown in FIG. 10 are recorded in adjacent sectors in a writable region of optical disk 4.

Figure 11:
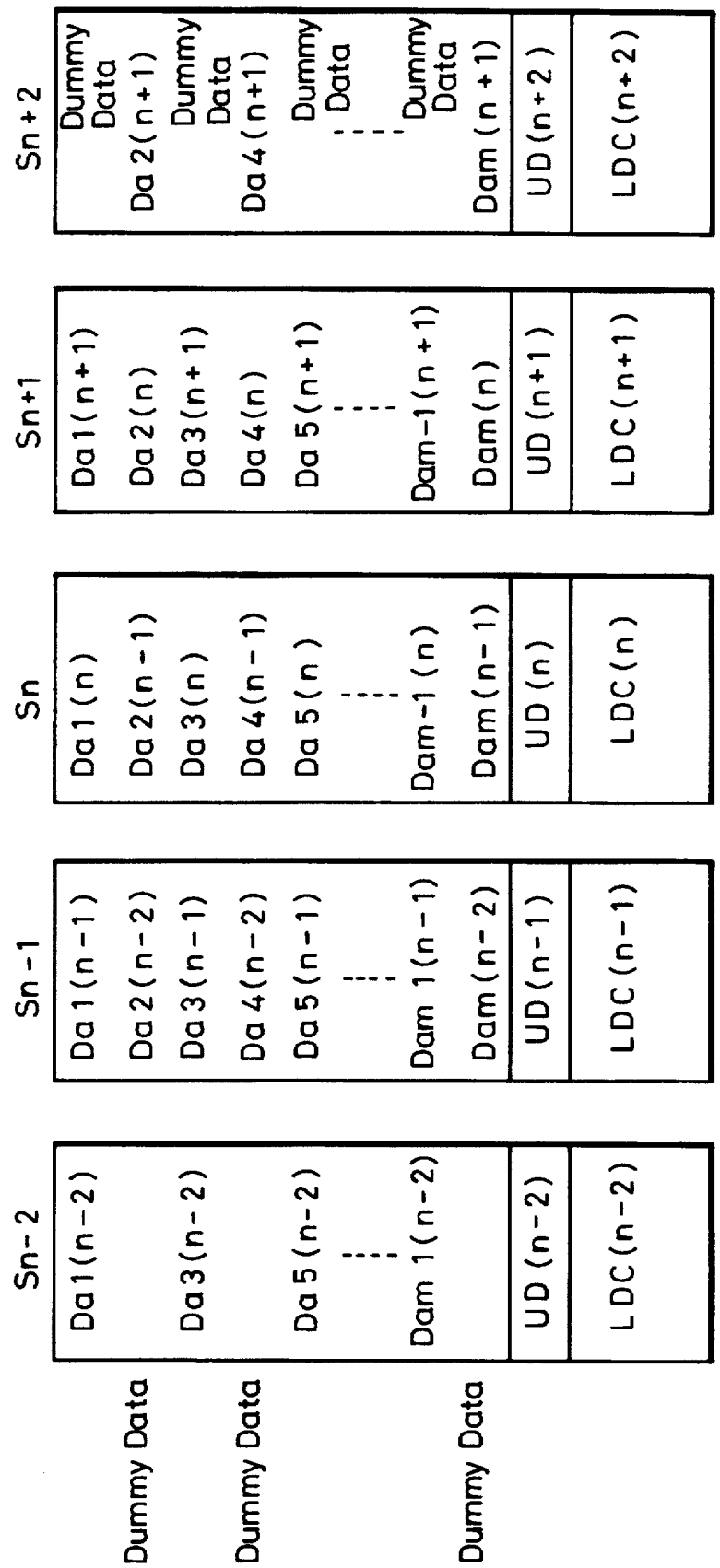
FIG. 11 illustrates the data structure of adjacent sectors in read-only areas of a disk in accordance with an embodiment of the present invention.

Referring now to FIG. 11, a diagram of the data structure of adjacent sectors stored in a read-only area of an optical disk in accordance with the present invention is illustrated. As previously discussed, upon reproduction of data stored on a read-only disk or on a read-only region of a hybrid disk, LDC/ECC decoder 67 (shown in FIG. 7) reproduces (i.e., restores) a sector of data by rearranging data from two of the reproduced sectors. FIG. 11 illustrates the data structure of "arranged" sectors stored on the optical disk. As shown, sectors $S_{n-2}$, $S_{n-1}$, $S_n$, $S_{n+1}$ and $S_{n+2}$ represent five consecutive sectors stored on a read-only region of an optical disk wherein each of these sectors is comprised of data from two original "pre-arranged" sectors. That is, a particular sector, e.g., sector $S_n$, includes data that originally was included in that sector, e.g., data Da1(n), Da3(n), Da5(n) ... Dam-1(n), UD(n) and LDC(n), and data originally included in the preceding sector, e.g., data Da2(n−1), Da4(n−1) ... Dam (n−1). Hence, for a particular sector $S_n$, both the long distance code LDC(n) and the CRC parity data UD(n) corresponds to that data stored in sector $S_n$ on the optical disk that originally was contained in ("pre-arranged") sector $S_n$ and to that data stored in sector $S_{n+1}$ on the optical disk that also originally was contained in ("pre-arranged") sector $S_n$.

Furthermore, a first sector $S_{n-2}$ located in a group of sectors $S_{n-2}$ to $S_{n+2}$ stored on an optical disk includes data originally from that sector, i.e., Da1(n−2), Da3(n−2) ... Dam-1(n−2), UD(n−2) and LDC(n−2), and dummy data which is located at those positions in sector $S_{n-2}$ whose data is stored in the following adjacent sector $S_{n-1}$. That is, since sector $S_{n-2}$ represents a first or "head" sector, there is no data that is shifted into that sector during arrangement of the data prior to recording the arranged sectors in a read-only area of an optical disk during manufacture thereof, and therefore, dummy data is supplied to fill in the "gaps."

Furthermore, an additional or "new" sector is created during arrangement of the sectors when some of the data in the original last sector, for example, sector $S_{n+1}$, is "shifted" out of that sector. That is, when data from sector $S_{n+1}$ is moved, as shown in FIG. 11, a new sector $S_{n+2}$ is formed and dummy data is stored in the gaps. In addition, Data LDC (n+2) in sector $S_{n+2}$ represents dummy data or may contain data that identifies this sector as a last one of the "arranged" sectors in a group, to be discussed.

Identification data that identifies the presence of a "head" sector of a group of sectors is stored as the undefined bytes in the undefined region UD(n−2) of sector $S_{n-2}$, and identification data that identifies the presence of a "last" sector of a group of arranged sectors is stored as the undefined bytes in the undefined region UD(n+2) of sector $S_{n+2}$. As a result of the stored identification data, a reproducing apparatus does not have to "guess" when a group of sectors begins and ends. That is, since it may not be possible during a recording process (i.e., a manufacture process) to record continuous or contiguous sectors, and data of two adjacent sectors are required to produce data of one sector during reproduction thereof, it is important to be able to determine the locations of the first and last sectors of a group of "arranged" sectors. Hence, a group can be comprised of any number of plural sectors.

Referring back to FIG. 10, it is shown that data D0 to D2027 (FIGS. 8–9) in an original "pre-arranged" sector, for example, sector $S_n$, is represented by data Da1(n), Da2(n), Da3(n) ... Dam(n). Each of the data units Da1, Da2, Da3 ... Dam in each of the sectors can represent any predetermined number of bytes. Then, and consistent with the above description of the present invention, when "pre-arranged" sectors are arranged, by a recording device during manufacture of a read-only disk or a hybrid disk, each of the even-numbered data units Da2, Da4, Da6 ... etc., are "shifted" to a successively adjacent sector, as shown in FIG. 11, before each of the sectors is recorded on the read-only disk or on the read-only region of a hybrid disk. Of course, the shifting of the even-numbered data units Da2(n+1), Da4(n+1) from the last original sector $S_{n+1}$ creates a new sector $S_{n+2}$ which also is recorded on the optical disk.

FIG. 12 illustrates the data structure of adjacent sectors in read-only areas of a disk when each of the data units Da1, Da2, etc., shown in FIG. 11 is comprised of 128 bytes of data. As previously discussed, there are 128 lines (i=3 to i=130 shown in FIGS. 8–9) of non-parity data in a sector and 16 bytes of data per line. Hence, each data unit includes 8 lines of data. For example, data unit Da1 includes bytes D0 to D127 (lines i=123 to i=130), data unit Da2 includes bytes D128 to D255 (lines i=115 to i=122), ..., and data unit Dam includes bytes D1920 to D2047. When sectors $S_{n-1}$, $S_n$ and $S_{n+1}$ are arranged in the manner described above, bytes D128 to D255, bytes D384 to D511, ..., and bytes D1920 to D2047 are shifted in each sector to the succeeding sector, and the data shifted from the original last sector form a new sector, e.g., sector $S_{n+2}$ (not shown in FIG. 12). Therefore, sector $S_{n+1}$ stored on a read-only area of an optical disk includes data D0–127(n+1), D128–255(n), D256–383(n+1), D384–511(n), D512–639(n+1) ... D1792–1919(n+1) and D1920–2047(n). Similarly, stored sectors $S_{n-1}$ and $S_n$ respectively include data from their own sector and the preceding sector as shown.

As described, sectors reproduced from a read-only optical disk or from a read-only area of a hybrid optical disk actually are produced from the data that is stored in two sectors adjacent one another on the optical disk. When a burst error occurs, it is possible that a relatively substantial amount of data in a particular sector cannot be reproduced. Generally, by means of performing error detection and error correction using the parity data contained in a sector, some or all of the unreproducable data can be restored. However, when sectors are arranged in accordance with the present invention, a burst error will affect approximately only half of the amount of data in a particular sector as would be affected if the sectors were not arranged as described. Since each arranged sector contains approximately half the amount of data as contained in that sector "rearranged" (or "pre-arranged"), because the other half of the data in the sector "belongs" to a different rearranged sector, the affect of a burst error on that sector is reduced substantially. Therefore, the need for error detection/correction is reduced; this however simply may be thought of as an increase in the error detection/correction capability. Furthermore, the improvement gained against burst errors does not increase the amount of error correction/detection data and does not require a substantial increase in processing time.

Figure 13:
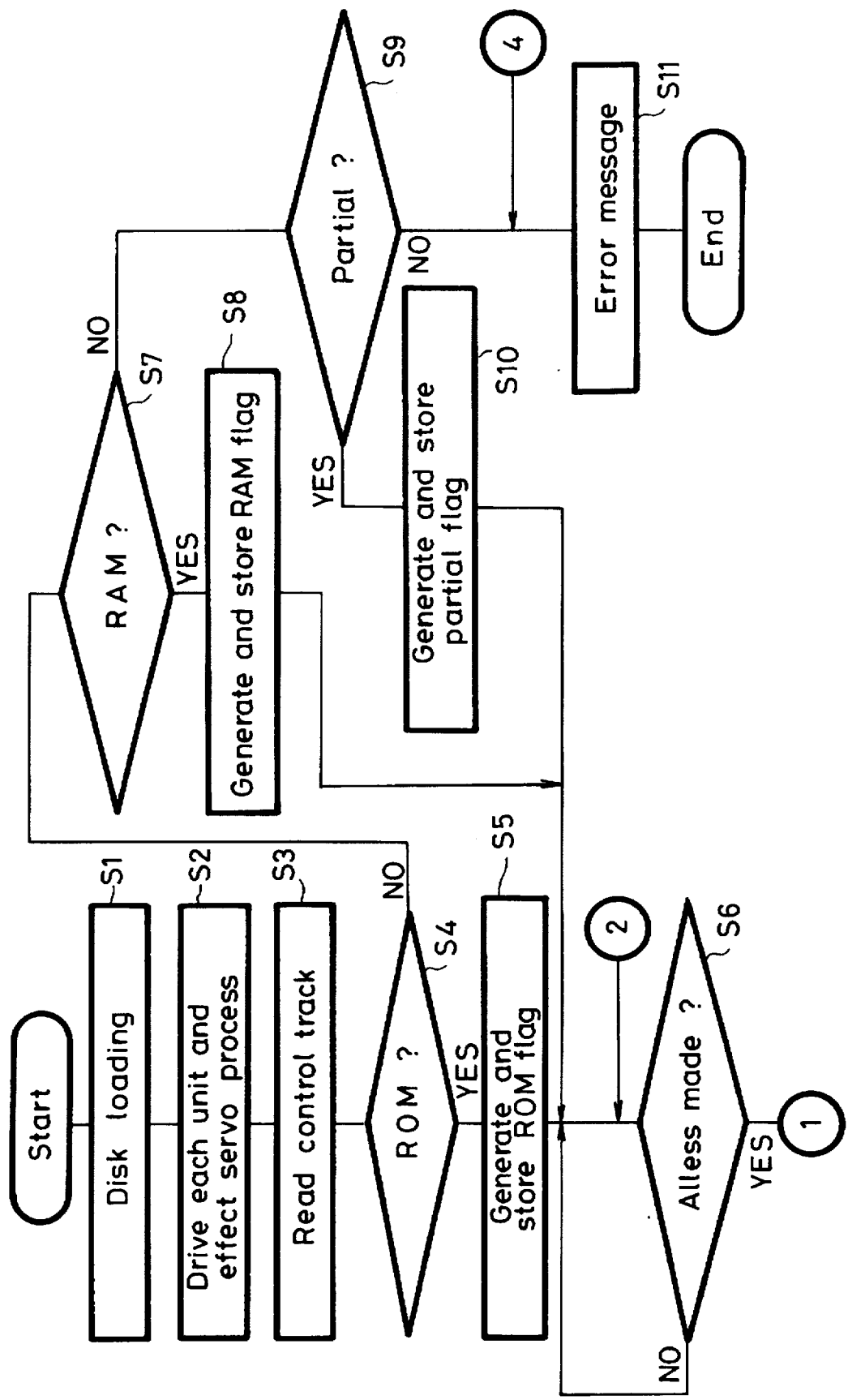
FIGS. 13–15 are flow charts of the method of recording to and reproducing from a record medium in accordance with the present invention.
Figure 14:
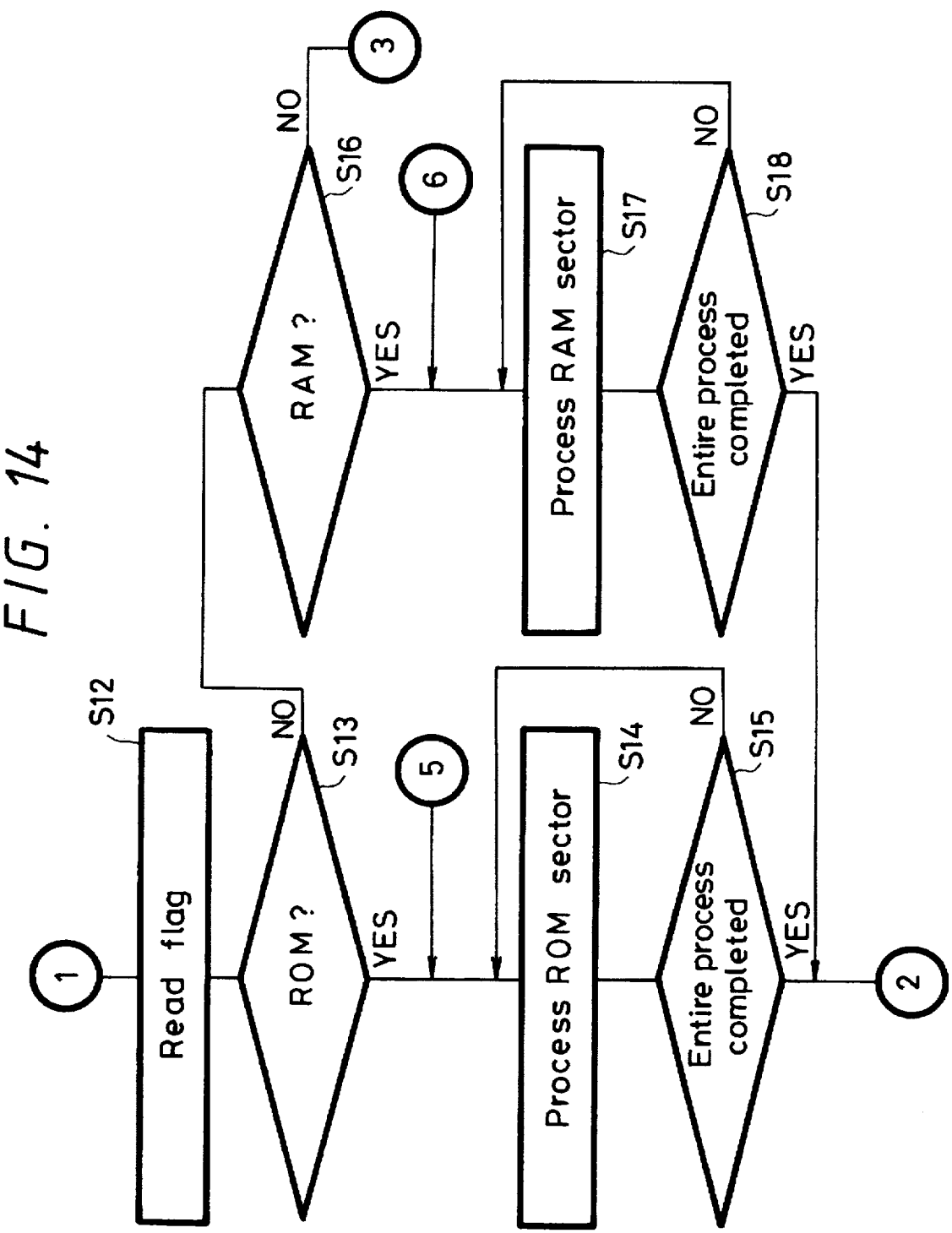
Figure 15:
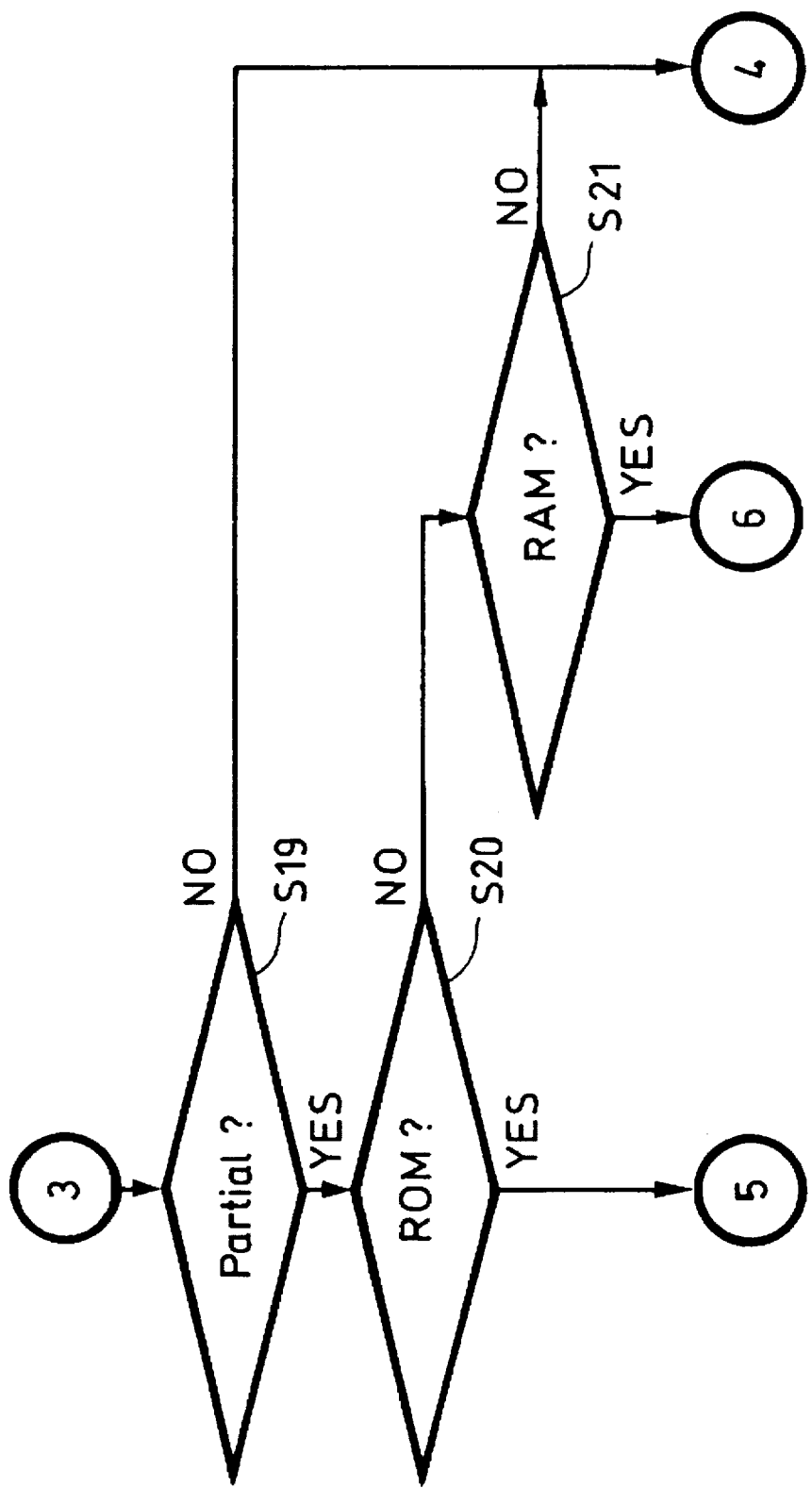

FIGS. 13–15 are flow charts of the operation of controller 2 to record to and reproduce from a record medium, as carried out by the optical disk drive shown in FIG. 1. The process begins when loading mechanism 5 loads an optical disk 4 into the optical disk drive at instruction s1. Upon loading, various servo processes are carried out at instruction s2 including the driving of spindle motor 6, drive motor 10, galvano motor 11 and focus actuator 12. When the optical disk reaches synchronized speed, as discussed above, one of the control tracks CTL (FIG. 4) on optical disk 4 is reproduced at instruction s3 in order to identify the type of recording medium of optical disk 4, to identify the various address information including the locations of the writable regions if the optical disk is a hybrid disk, etc., and if it is determined, at inquiry s4, that the record medium is a read-only optical disk (i.e., a ROM), then the process proceeds to instruction s5 whereat a ROM flag is generated and stored in a memory in the optical disk drive (e.g., in RAM 63 shown in FIG. 7). On the other hand, if the record medium is not a read-only type memory, then it is determined at inquiry s7 whether the optical disk is a random access memory (RAM), that is, a writable optical disk such as a magneto-optical disk. If the optical disk is a RAM type device, then a RAM flag is generated and stored in memory at instruction s8. However, if the optical disk is not a RAM type device, then it is determined at inquiry s9 whether the optical disk is a hybrid (partial) disk which has both writable regions and read-only regions. If the optical disk is a hybrid disk, then a "partial" flag is generated and stored in memory at instruction s10. On the other hand, if it is determined at inquiry s9 that the optical disk is not a hybrid disk, an error message is generated in CPU 60, supplied to host computer 3 and displayed to the user at instruction s11 and the process is terminated. An exemplary error message that may be displayed is "Disk Type Read Error. Please Insert the Disk Again or Use Another Disk."

Upon generating and storing one of the above flags pursuant to instructions S5, S8 or S10, the process proceeds to inquiry s6 whereat CPU 60 waits until it receives a disk access command. Upon receipt of a disk access command, the stored flag is read from the optical disk drive memory at instruction s12 (FIG. 14). If it is determined at inquiry s13 based on the reproduced flag that the optical disk is a read-only type record medium, the process proceeds to instruction s14 whereat two sectors are reproduced from the read-only type optical disk. If, however, a reproduced sector still resides in LDC/ECC decoder 67, only one sector need be reproduced from the optical disk. The two sectors (i.e., the two sectors that are reproduced or the single sector that is reproduced together with the sector still resident in the LDC/ECC decoder) are rearranged in the manner described above with reference to FIGS. 11 and 12 and error corrected using the CRC parity data and long distance codes stored therein. It is noted that any dummy data stored in a sector is either ignored or removed by CPU 60. Upon completion of the reproduction process, as determined at inquiry s15, the process returns to inquiry s6.

However, if it is determined at inquiry s13, based on the reproduced flag, that the optical disk is not a read-only type record medium, inquiry s16 inquires whether the optical disk is a random-access type memory (e.g., a magneto-optical disk). If the optical disk is a random-access type memory, the process proceeds to instruction s17 whereat a sector either is recorded on optical disk 4 or reproduced from optical disk 4 depending on the instruction from host computer 3. During a recording operation, error detection/correction data is added to a sector prior to its being recorded on the optical disk. Conversely, during a reproducing operation, a reproduced sector is error corrected and supplied out. No "arranging" or "rearranging" of data in a sector is carried out when the optical disk is a random-access type (i.e., writable) record medium. Furthermore, since there is no dummy data stored in a sector recorded on or reproduced from a writable record medium, no processing thereof is required. Upon completion of the above recording or reproducing of a sector to or from a writable record medium, as determined at inquiry s18, the process returns to inquiry s6.

If it is determined at inquiry s16, based on the reproduced flag, that the optical disk is not a random-access type memory, the process proceeds to inquiry s19 (FIG. 15) where it is determined whether the optical disk is a partial (or hybrid) type memory which has both writable regions and read-only regions, and if so, it is determined at inquiry s20 whether the sector to be accessed is located in a read-only region of the optical disk. If the sector on the disk to be accessed is in a read-only region, the process proceeds to instruction s14 whereat that region is reproduced in a manner similar to that described above with respect to the reproduction of a sector from a read-only type optical disk.

If the sector on the disk to be accessed is not in a read-only region, then it is determined at inquiry s21 whether the sector to be accessed is located in a random-access (writable) region of the optical disk. If the sector on the disk to be accessed is in the writable RAM region, the process proceeds to instruction s17 whereat data is either recorded on or reproduced from that region in a manner similar to that described above with respect to the recording and reproduction of data to and from a random-access type record medium. However, if it is determined at inquiry s21 that the sector to be accessed is not located in a random-access (writable) region of the optical disk, the process proceeds to instruction s11 whereat the error message is generated and displayed to the user. Furthermore, if it is determined that the optical disk is not a partial (or hybrid) type memory at inquiry S19, the error message is generated and displayed at instruction s11.

In another embodiment of the present invention, LDC/ECC decoder 67 shown in FIG. 7 stores in its RAM 67 data contained in two reproduced sectors in a particular manner which incorporates the rearranging process previously discussed. Here, when data of two sectors, for example, sector $S_{n-2}$ and sector $S_{n-1}$ (shown in FIG. 11), are reproduced from a read-only optical disk or from a read-only area of a hybrid optical disk, the data corresponding to (rearranged) sector $S_{n-2}$ which is contained in reproduced sector $S_{n-2}$, for example, data Da1(n-2), Da3(n-2), etc., is stored at a location corresponding to a first sector in RAM 67a. In addition, data corresponding to rearranged sector $S_{n-2}$ which is contained in reproduced sector $S_{n-1}$, for example, data Da2(n-2), Da4(n-2), etc., is stored at a location also corresponding to the first sector in RAM 67a, and data corresponding to rearranged sector $S_{n-1}$ which is contained in reproduced sector $S_{n-1}$, for example, data Da1(n-1), Da3(n-1), etc., is stored at a location corresponding to a second sector in RAM 67a.

In this embodiment, the two sectors stored in RAM 67a do not undergo a rearranging or shifting process per se, and instead, such shifting of data already is accomplished by directing the reproduced data of each sector to the appropriate address in RAM 67a. Error detection and error correction then is performed in the same manner as previously discussed. Of course, when the next sector $S_n$ is reproduced, the data corresponding to rearranged sector $S_{n-1}$ which is contained in reproduced sector $S_n$, e.g., data Da2(n-1), Da4(n-1), etc., is stored at a location corresponding to the second sector in RAM 67a and data corresponding to rearranged sector $S_n$ which is contained in reproduced sector $S_n$, e.g., data Da1(n), Da3(n), etc., is stored at a location corresponding to the "first" or other sector in RAM 67a. Hence, data of each reproduced sector is stored in alternating locations of RAM 67a so that a formal shifting of data already stored therein is unnecessary.

Figure 16:
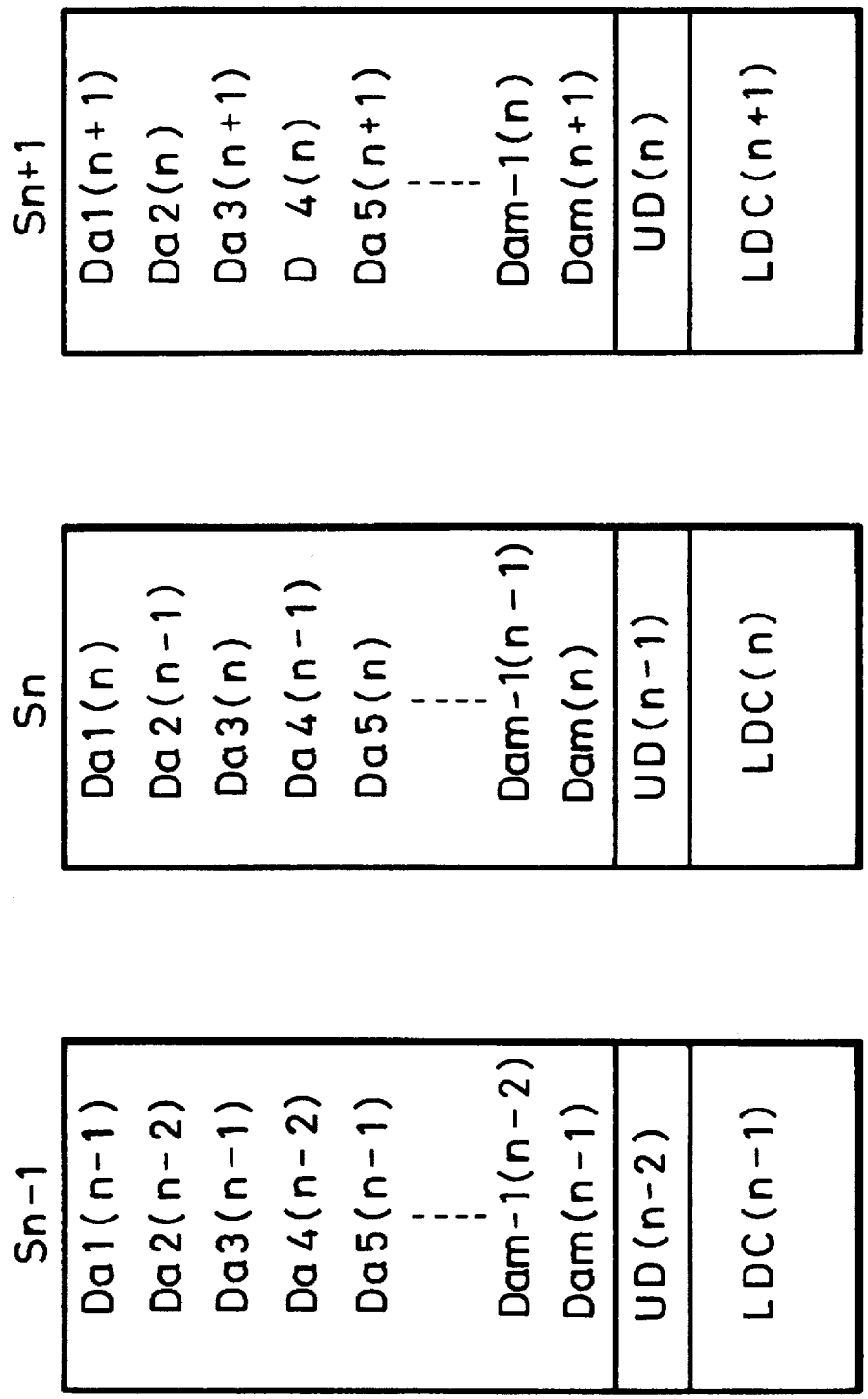
FIG. 16 illustrates the data structure of sectors of an optical disk in accordance with another embodiment of the present invention.

In a further embodiment of the present invention, FIG. 16 illustrates the data structure of adjacent sectors stored in a read-only optical disk or in a read-only area of an optical disk wherein the data in the undefined regions of each sector also are moved or shifted to an adjacent sector. As shown, a particular sector, for example, sector $S_n$, includes data Da1(n), Da3(n), Da5(n) . . . Dam(n) and LDC(n) that originally was included in that sector (i.e., the pre-arranged sector $S_n$), and includes data Da2(n−1), Da4(n−1) . . . Dam-1(n−1) and UD(n−1) that originally was included in the preceding sector (i.e., the pre-arranged sector $S_{n-1}$). Hence, parity data (e.g., CRC1–CRC8) pertaining to a particular sector $S_n$ still is reproducible when a burst error causes the undefined region of sector $S_n$, which actually contains the undefined region for section $S_{n-1}$, to become unreproducable. In addition, data in the undefined region UD(n−2) in sector $S_{n-1}$ can contain data that identifies this sector as a first one of the arranged sectors in a group, as previously discussed.

Figure 17:
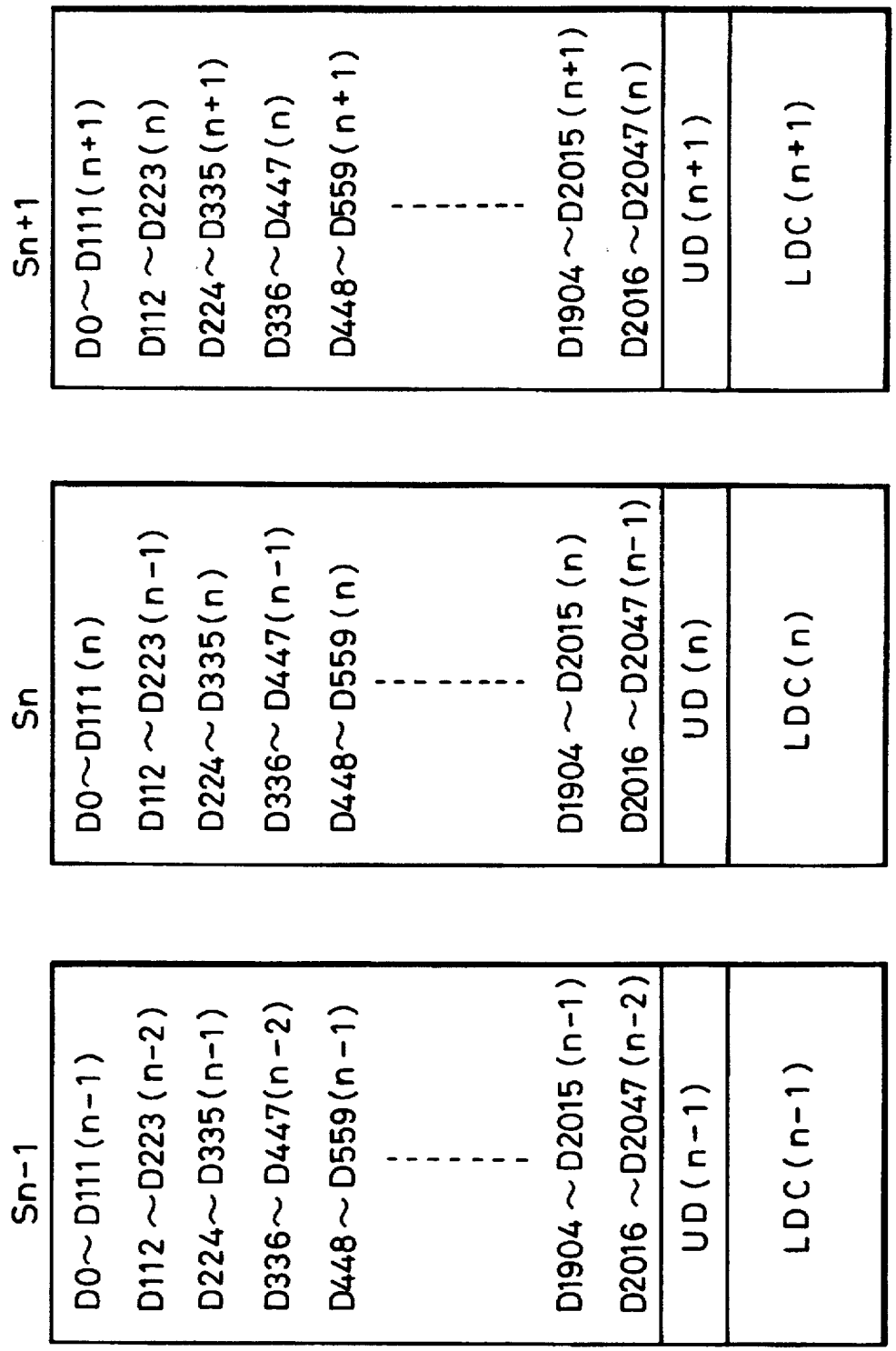
FIG. 17 illustrates a specific example of the data structure of sectors shown in FIG. 16.

FIG. 17 illustrates the data structure of adjacent sectors in read-only areas of a disk in accordance with another embodiment of the present invention in which each of the data units Da1, Da2, etc., (see FIG. 11) is comprised of 7 lines (FIGS. 8–9) or 112 bytes of data. As shown, data unit Da1 in each sector includes bytes D0 to D111 (lines i=124 to i=130), data unit Da2 includes bytes D112 to D223 (lines i=117 to i=123), . . . data unit Dam-1 includes bytes D1904 to D2015 (lines i=5 to i=11), and data unit Dam includes the remaining data bytes D2016 to D2047 (lines i=3 and i=4). Furthermore, when sectors $S_{n-1}$, $S_n$ and $S_{n+1}$ are arranged in the manner described above, bytes D112 to D223, bytes D336 to D477, . . . . . and bytes D2016 to D2047 are shifted in each sector to the succeeding sector, and the data shifted from the original last sector, e.g., sector $S_{n+1}$, form a new sector $S_{n+2}$ (not shown in FIG. 12). Therefore, sector $S_{n+1}$ stores on a read-only area of an optical disk bytes D0–111 (n+1), D112–223(n), D224–335(n+1), D336–447(n), D448–559(n+1) . . . D1904–2015(n+1) and D2016–2047(n), as well as UD(n+1) and LDC(n+1). Each of stored sectors $S_{n+1}$ and $S_n$ similarly includes data from its own sector and the preceding sector as shown.

In still another embodiment of the present invention, each of the sectors having the data structure shown in FIG. 17 may have its respective undefined regions moved or shifted to the succeeding sector. Such sectors have the data structure shown in FIG. 16 except each data unit is comprised of 7 lines or 112 bytes of data. In this instance, a sector $S_n$ includes data D0 to D111(n), D112 to D223(n−1) . . . D2016 to D2047(n−1), and further includes data in an undefined region UD(n−1) from the preceding sector $S_{n-1}$, as well as the long distance code LDC(n) from sector $S_n$. Hence, parity data (e.g., CRC1–CRC8) pertaining to a particular sector $S_n$ still is reproducible when a burst error causes the undefined region of sector $S_n$, which actually contains the undefined region for sector $S_{n-1}$, to become unreproducable. Similarly, the other sectors, e.g., sectors $S_{n-1}$ and $S_{n+1}$ each includes data in the undefined region from the respective preceding sector $S_{n-2}$ and $S_n$. Of course, if sector $S_{n+1}$ is the first sector in the group, dummy data or identification data may be included in the undefined region UD(n−2) in sector $S_{n-1}$.

Figure 18:
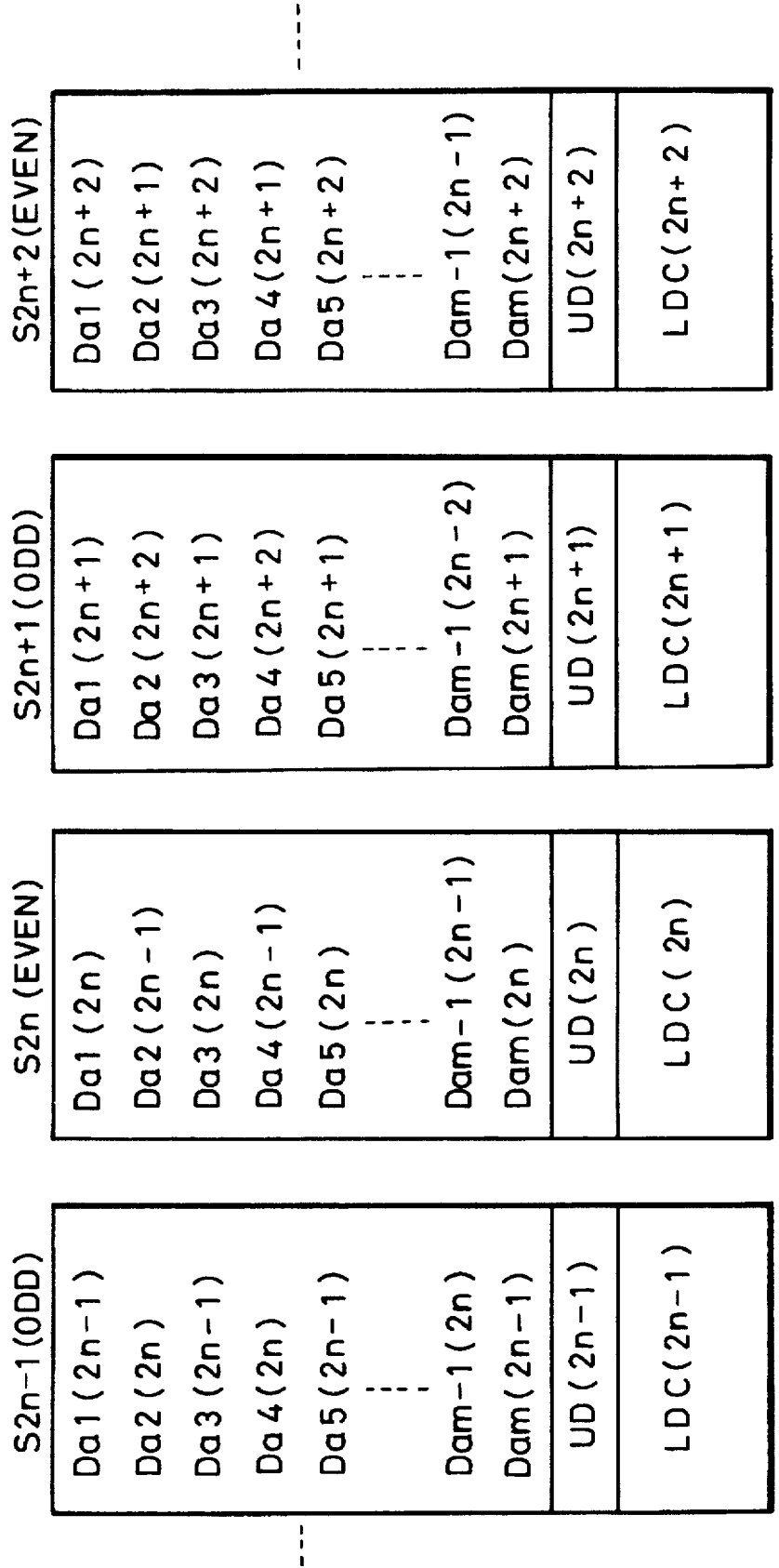
FIG. 18 illustrates the data structure of sectors of an optical disk in accordance with a further embodiment of the present invention.

FIG. 18 illustrates the data structure of adjacent sectors stored in a read-only area of an optical disk in accordance with another embodiment of the present invention. As previously discussed, two sectors are reproduced from the optical disk and stored in RAM 67a in LDC/ECC decoder 67 (shown in FIG. 7). In this embodiment, two "rearranged" or original sectors (as opposed to one sector in the above embodiments) can be produced from only the two "arranged" sectors stored in RAM 67a, as described below. As shown in FIG. 18, the sectors stored on an optical disk are "paired" together wherein each pair of sectors is comprised of an odd-numbered sector and an even-numbered sector, and the respective odd and even-numbered sectors in each pair contain data of both thereof. That is, odd-numbered sector $S_{2n-1}$ includes data that originally was included in that sector, e.g., data Da1(2n−1), Da3(2n−1), Da5(2n−1) . . . Dam(2n−1), UD(2n−1) and LDC(2n−1), and data originally included in the even-numbered sector of the pair, e.g., data Da2(2n), Da4(2n) . . . Dam-1(2n). Similarly, odd-numbered sector $S_{2n+1}$ includes data that originally was included in that sector, e.g., data Da1(2n+1), Da3(2n+1), Da5(2n+1) . . . Dam(2n+1), UD(2n+1) and LDC(2n+1), and data originally included in the odd-numbered sector of the pair, e.g., data Da2(2n+2), Da4(2n+2) . . . Dam-1(2n+2).

Hence, LDC/ECC decoder 67 produces two rearranged sectors by swapping the appropriate data in one sector stored in RAM 67a with data in the other sector stored in RAM 67a. In addition, since no "new" sectors are created when the sectors are arranged (during, for example, manufacture of the optical disk) and since there are no gaps created in the first sector upon arranging thereof, there is no need to add dummy data to any of the arranged sectors.

Figure 19:
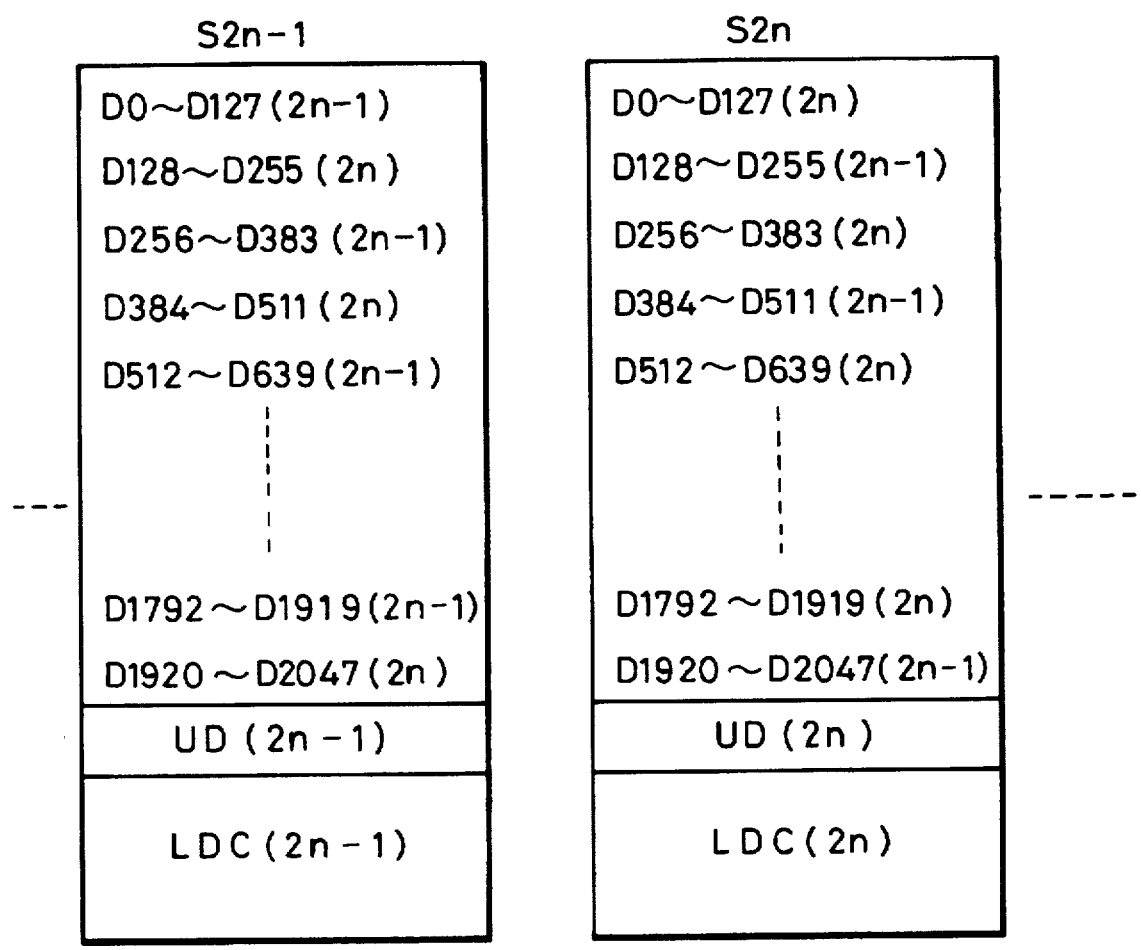
FIG. 19 illustrates a specific example of the data structure of sectors shown in FIG. 18.

FIG. 19 illustrates the data structure of paired sectors (FIG. 18) in a read-only area of a disk in accordance with another embodiment of the present invention in which each of the data units Da1, Da2, etc., of each sector in the pair is comprised of 8 lines (see FIGS. 8–9) or 128 bytes of data. As shown, data unit Da1 in each sector (e.g., sector $S_{2n-1}$ or sector $S_{2n}$) includes bytes D0 to D127 (lines i=123 to i=130), data unit Da2 includes bytes D128 to D255 (lines i=115 to i=122), etc. Each of the paired sectors $S_{2n-1}$ and $S_{2n}$ is arranged in the manner described above with reference to FIG. 18, and thus, bytes D128 to D255, bytes D384 to D511, etc., in each sector are moved to the other sector in the pair. Therefore, sector $S_{2n-1}$ stored on a read-only area of an optical disk includes data D0–127(2n−1), D128–255(2n) . . . D1920–2047(2n), UD(2n−1) and LDC(2n−1). Stored sector $S_{2n}$ includes the other data of sectors $S_{2n-1}$ and $S_{2n}$. Alternatively, the undefined region (e.g., UD(2n−1), UD(2n)) of each sector is located in the other sector in the pair in a manner similar to that shown in FIG. 16.

Figure 20:
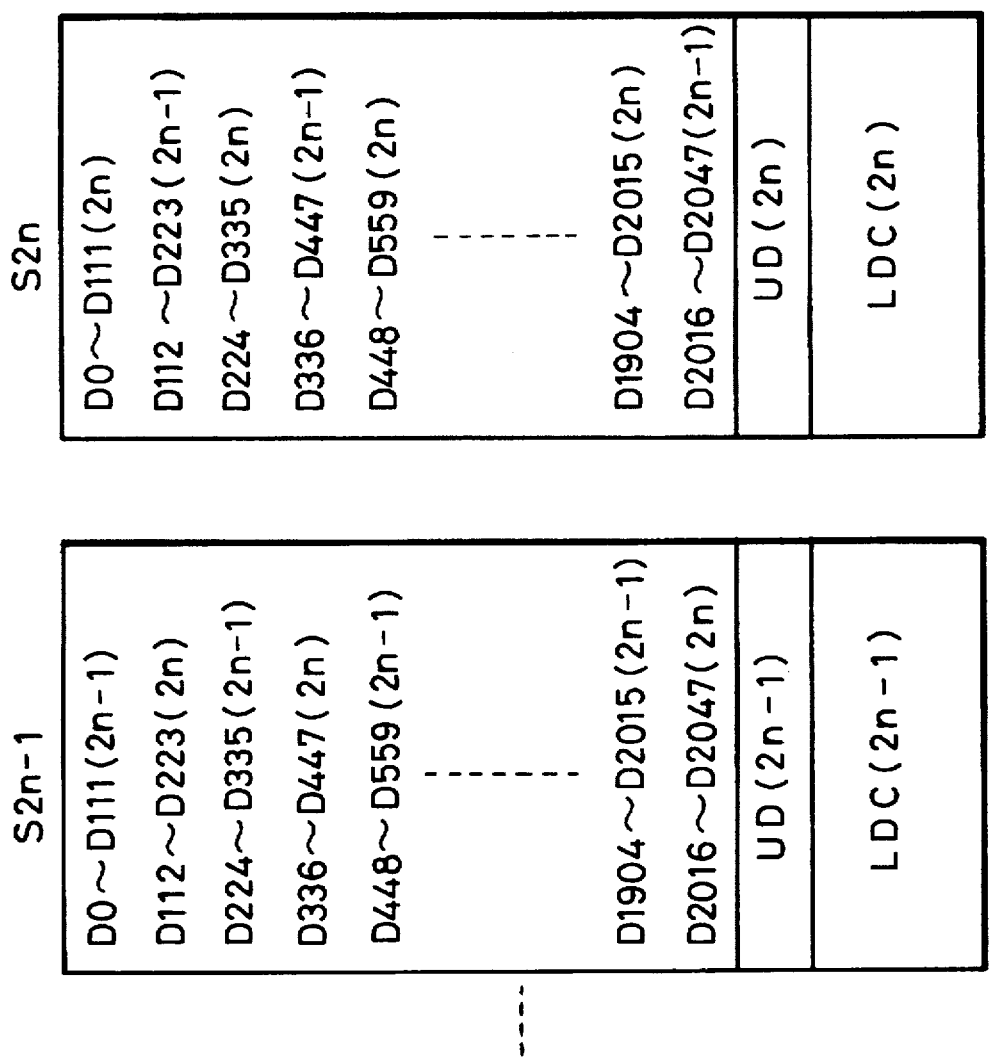
FIG. 20 illustrates another specific example of the data structure of sectors of an optical disk.

FIG. 20 illustrates the data structure of paired sectors (FIG. 18) in a read-only area of a disk in accordance with a further embodiment of the present invention in which each of the data units Da1, Da2, etc., is comprised of 7 lines (FIGS. 8–9) or 112 bytes of data. As shown, data unit Da1 in each sector includes bytes D0 to D111 (lines i=124 to i=130), data unit Da2 includes bytes D112 to D223 (lines i=117 to i=123), etc. Each of the paired sectors $S_{2n-1}$ and $S_{2n}$ is arranged in the manner described above with reference to FIG. 18, and thus, bytes D112 to D223, bytes D336 to D477, etc., in each sector are moved to the other sector in the pair. Therefore, sector $S_{2n-1}$ stored on a read-only area of an optical disk includes data D0–111(2n−1), D112–223(2n), D224–335(2n−1), D336–447(2n), . . . D2016–2047(2n), UD(2n−1) and LDC(2n−1). Stored sector $S_{2n}$ includes the other data of the sectors $S_{2n-1}$ and $S_{2n}$. Alternatively, the undefined region (e.g., UD(2n−1), UD(2n)) of each sector is located in the other sector in the pair in a manner similar to that shown in FIG. 16.

In yet another embodiment of the present invention, each sector stored on the optical disk is comprised of data units which contain different numbers of lines of data (i.e., different numbers of bytes of data). For example, data units Da1, Da2, Da3 ... Dam shown in FIG. 11 or shown in FIG. 18 may include 7 lines of data, 8 lines of data, 7 lines of data, . . . , 8 lines of data, respectively. The number of lines in each data unit may alternate between 7 and 8 lines of data or alternate between other numbers of lines of data.

While the present invention has been particularly shown and described in conjunction with preferred embodiments thereof, it will be readily appreciated by those of ordinary skill in the art that various changes may be made without departing from the spirit and scope of the invention. For example, the present invention has been described as forming sectors from data contained in two reproduced sectors, however, the present invention is not limited to combining only two sectors, and may generate a sector from data contained in three or more reproduced sectors.

As another example, although the present discussion involves storing alternating data units in a sector in a succeeding sector, the present invention is not limited solely to moving alternating data units and may involve moving other configurations of data in each sector.

Therefore, it is intended that the appended claims be interpreted as including the embodiments described herein, the alternatives mentioned above, and all equivalents thereto.

What is claimed is:

1. A method of recording successive data elements on a record medium, comprising the steps of:
   receiving said data elements, each of the data elements having a plurality of data;
   adding to each data element error detection and error correction data derived from the data element;
   transferring some of the data in a respective data element to a different data element to produce arranged data elements; and
   recording each of said arranged data elements in a respectively different region of said record medium.

2. The method of claim 1, wherein said some of the data in a respective data element are transferred to corresponding locations in said different data element.

3. The method of claim 1, wherein each said arranged data element is formed of data derived from two received data elements.

4. The method of claim 1, wherein said data elements are received in pairs, each pair including an odd-numbered data element and an even-numbered data element; and the step of transferring is carried out by swapping some of the data in the respective odd-numbered and even-numbered data elements in each said pair of data elements.

5. The method of claim 1, wherein the successive data elements include a first data element and a last data element; and further comprising the step of adding identification data to said first and last data elements to identify those data elements as the first data element and last data element, respectively, in a series of arranged data elements.

6. The method of claim 1, wherein said error detection and error correction data in a respective data element are not transferred, such that said error detection and error correction data in each of said arranged data elements are derived from the data that had been transferred as well as from the data that remained in said data element.

7. The method of claim 1, wherein each of the arranged data elements is recorded in a respectively different sector on said record medium.

8. The method of claim 1, wherein said record medium includes a read-only area having a plurality of regions; and each of the arranged data elements is recorded in a respectively different region of the read-only area of said record medium.

9. The method of claim 1, further comprising the step of dividing each data element into a succession of data units; and wherein alternate data units in each said data element are transferred to said different data element.

10. The method of claim 9, wherein each said alternate data unit in a respective data element is transferred to a corresponding location in said different data element.

11. The method of claim 1, wherein the transferred data includes some of said error detection and error correction data in said respective data element.

12. The method of claim 11, wherein said error detection and error correction data includes cyclic redundancy code data and Reed-Solomon codes, and the transferred error detection and error correction data comprises only said cyclic redundancy code data.

13. The method of claim 1, wherein said some of the data in a respective data element are transferred to a respectively adjacent data element in said successive data elements.

14. The method of claim 13, wherein the successive data elements include a first data element and a last data element; and wherein some of the data in the last data element are transferred to a new data element.

15. The method of claim 14, further comprising the step of adding dummy data to locations in said new data element which do not receive data from said last data element.

16. The method of claim 14, further comprising the step of adding identification data to said new data element for identifying the new data element as a last data element in a series of arranged data elements.

17. A method of reproducing successive data elements recorded as arranged data elements on a record medium in which each arranged data element includes data from two respectively different unarranged data elements, comprising the steps of:
   reproducing said successive arranged data elements from said record medium, each reproduced arranged data element having a plurality of data including error detection and error correction data;
   transferring some of the data in a reproduced arranged data element to a different reproduced arranged data element to produce rearranged data elements;
   detecting and correcting errors in each of said rearranged data elements in accordance with the error detection and error correction data in said rearranged data element; and
   supplying the error corrected rearranged data elements as unarranged data elements.

18. The method of claim 17, wherein said some of the data in a respective arranged data element are transferred to corresponding locations in said different arranged data elements to produce said rearranged data elements.

19. The method of claim 17, wherein each said rearranged data element is formed of data derived from two arranged data elements.

20. The method of claim 17, wherein the successive data elements reproduced from the record medium are comprised of pairs of arranged data elements, each pair including an odd-numbered arranged data element and an even-numbered arranged data element; and the step of transferring is carried out by swapping some of the data in the respective odd-numbered and even-numbered arranged data elements in each said pair of arranged data elements.

21. The method of claim 17, wherein said error detection and error correction data in a respective arranged data element are not transferred, such that said error detection and error correction data in each of said arranged data elements are derived from the data that had been transferred as well as from the data that remained in that arranged data element.

22. The method of claim 17, wherein said record medium includes a plurality of sectors; and wherein each of the arranged data elements is reproduced from a different sector on said record medium.

23. The method of claim 17, wherein the successive arranged data elements reproduced from said record medium include a first arranged data element and a last arranged data element, each having identification data identifying the arranged data element as the first or last arranged data element, respectively, and further comprising the step of identifying said first and last arranged data elements as a function of the identification data therein.

24. The method of claim 23, wherein some of the data in each of the arranged data elements are transferred in accordance with the identification data in the first and last arranged data elements.

25. The method of claim 17, wherein each of the reproduced arranged data elements is comprised of a succession of data units; and wherein alternate data units in a respective arranged data element are transferred to said different arranged data element.

26. The method of claim 25, wherein each said alternate data unit in a respective arranged data element is transferred to a corresponding location in said different arranged data element.

27. The method of claim 17, wherein the transferred data includes some of said error detection and error correction data in said respective arranged data element.

28. The method of claim 27, wherein said error detection and error correction data includes cyclic redundancy code data and Reed-Solomon codes, and the transferred error detection and error correction data comprises only said cyclic redundancy code data.

29. The method of claim 17, wherein said some of the data in a respective arranged data element are transferred to a respectively adjacent arranged data element in said series to produce a series of rearranged data elements.

30. The method of claim 29, wherein the successive arranged data elements reproduced from said record medium include N+1 arranged data elements; and wherein some of the data in the N+1th arranged data element are transferred to the Nth arranged data element to produce an Nth rearranged data element.

31. The method of claim 30, wherein the N+1th arranged data element includes dummy data at locations from which data were transferred to the Nth arranged data element; and further comprising the step of removing the dummy data from said N+1th arranged data element so that only N rearranged data elements are produced.

32. A method of reproducing data recorded as arranged data elements on a record medium, comprising the steps of:
reproducing at least two arranged data elements from said record medium, each of said arranged data elements having a plurality of data including error detection and error correction data;
identifying in each of the reproduced arranged data elements data therein which is associated with a single rearranged data element, said rearranged data element containing data derived from both of the reproduced arranged data elements;
storing in a memory data included in a reproduced arranged data element which has been identified as being associated with said single rearranged data element and generating therefrom said single rearranged data element;
detecting and correcting errors in the generated single rearranged data element in accordance with the reproduced error detection and error correction data; and
supplying the error corrected single rearranged data element as an output.

33. A method of reproducing arranged data from a read-only, a writable or a hybrid record medium, comprising the steps of:
identifying the record medium as a read-only record medium, a writable record medium or a hybrid record medium, the latter having both read-only and writable regions;
identifying the read-only regions and the writable regions of said record medium when said record medium is identified as a hybrid record medium;
reproducing from said read-only or writable region arranged data elements containing error detection and error correction data;
transferring some of the data in a reproduced arranged data element to a different arranged data element to produce rearranged data elements when said data elements are reproduced from said read-only region;
providing each of said arranged data elements as said rearranged data elements when said data elements are reproduced from said writable region;
detecting and correcting errors in a rearranged data element in accordance with the error detection and error correction data in said each rearranged data element; and
supplying the error corrected rearranged data elements as an output.

34. The method of claim 33, wherein said some of the data in a respective arranged data element are transferred to corresponding locations in said different arranged data elements to produce said rearranged data elements.

35. The method of claim 33, wherein each said rearranged data element is formed of data derived from two arranged data elements.

36. The method of claim 33, wherein a series of arranged data elements is reproduced; and said some of the data in a respective arranged data element are transferred to a respectively adjacent arranged data element in said series to produce a series of rearranged data elements.

37. The method of claim 33, wherein the series of arranged data elements includes N+1 arranged data elements; and wherein some of the data in the N+1th arranged data element are transferred to the Nth arranged data element to produce an Nth rearranged data element.

38. The method of claim 33, wherein when said data elements are reproduced from said read-only region the N+1th arranged data element includes dummy data at locations from which data were transferred to the Nth arranged data element; and further comprising the step of removing the dummy data from said N+1th arranged data element so that only N rearranged data elements are produced.

39. The method of claim 33, wherein pairs of arranged data elements are reproduced from said record medium, each pair including an odd-numbered arranged data element and an even-numbered arranged data element; and the step of transferring is carried out by swapping some of the data in the respective odd-numbered and even-numbered arranged data elements in each said pair of arranged data elements.

40. A record medium having a read-only area at which data is stored, said read-only area including a plurality of sectors having stored therein data including error detection and error correction data, some of said data in each sector being derived from that sector and other data in said sector being derived from a different sector, and said error detection and error correction data in said sector being derived both from the data in that sector and from the data in said different sector.

41. The record medium of claim 40, wherein said other data in said sector is derived from an adjacent sector on said record medium.

42. A record medium having successive data recorded thereon, the record medium comprising a plurality of concentric tracks located between an outer periphery and an inner periphery of said record medium, each track having a plurality of equal angular servo areas having pit patterns for providing tracking and clock control, each servo area being followed by a plurality of data segments in which user data is recorded, said user data being partitioned into a plurality of sectors each containing a plurality of data segments, the user data in a respective sector including user data derived from that respective sector and user data derived from a sector adjacent the respective sector, each sector also containing parity data corresponding to the user data derived from said respective sector and corresponding to user data derived from the adjacent sector.

43. The record medium of claim 42, wherein first and last ones of said sectors in a track include predetermined identification data.

44. The record medium of claim 42, further comprising an additional sector in a track having user data stored therein derived from a last one of the plurality of sectors and also having dummy data stored therein.

45. The record medium of claim 42, wherein each pair of adjacent sectors comprises an odd-numbered sector and an even-numbered sector; and user data in each of the odd-numbered and even-numbered sectors includes user data derived both the odd-numbered and even-numbered sector in said pair.

* * * * *